United States Patent
Cho et al.

(10) Patent No.: US 11,789,566 B2
(45) Date of Patent: Oct. 17, 2023

(54) DISPLAY DEVICE AND A DRIVING METHOD THEREOF

(71) Applicant: SAMSUNG DISPLAY CO., LTD., Yongin-si (KR)

(72) Inventors: Hyun Wook Cho, Yongin-si (KR); Min Hong Kim, Yongin-si (KR); Jung Mok Park, Yongin-si (KR); Il Ho Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 49 days.

(21) Appl. No.: 17/674,980

(22) Filed: Feb. 18, 2022

(65) Prior Publication Data

US 2022/0391069 A1    Dec. 8, 2022

(30) Foreign Application Priority Data

Jun. 8, 2021  (KR) .......................... 10-2021-0074418

(51) Int. Cl.
G06F 3/041    (2006.01)
G06F 3/044    (2006.01)

(52) U.S. Cl.
CPC ........ *G06F 3/04184* (2019.05); *G06F 3/0446* (2019.05); *G06F 3/04166* (2019.05)

(58) Field of Classification Search
None
See application file for complete search history.

(56) References Cited

U.S. PATENT DOCUMENTS

2020/0393949 A1*  12/2020  Kim ...................... G06F 3/0446

* cited by examiner

*Primary Examiner* — Robin J Mishler
(74) *Attorney, Agent, or Firm* — F. Chau & Associates, LLC

(57) ABSTRACT

A display device including: pixels; a data driver configured to start outputting data voltages to at least some of the pixels at a first time during a horizontal period, and end outputting the data voltages at a second time during the horizontal period; sensors; and a sensor driver configured to change a logic level of a sensing signal of at least some of the sensors at a third time different from the first time and the second time during the horizontal period, wherein at least one of the first time, the second time, and the third time is changed according to a number of times a logic level of a vertical synchronization signal is changed while a logic level of a horizontal synchronization signal is maintained.

20 Claims, 24 Drawing Sheets

DISPLAY DEVICE AND A DRIVING METHOD THEREOF

CROSS-REFERENCE TO RELATED APPLICATION

The present application claims priority under 35 U.S.C. § 119(a) to Korean Patent Application No. 10-2021-0074418 filed on Jun. 8, 2021 in the Korean Intellectual Property Office, the disclosure of which is incorporated by reference herein in its entirety.

1. TECHNICAL FIELD

The present disclosure relates to a display device and a driving method thereof.

2. DISCUSSION OF RELATED ART

A display device is an output device for presentation of information in visual form. For example, a display device is a connection medium between a user and information. Accordingly, display devices such as a liquid crystal display device and an organic light emitting display device are increasingly used in various electronic devices such as smartphones, digital cameras, notebook computers, navigation systems, and smart televisions.

Display devices may employ touch screen technologies that are responsive to a user's touch. Such a display device may include a display unit for displaying an image and a sensor unit for sensing a touch position. In general, the sensor unit may overlap the display unit on a plane. In this case, however, an unintended parasitic capacitance may exist between sensors of the sensor unit and pixels of the display unit.

Sensing signals of the sensor unit and display signals of the display unit may interfere with each other due to the parasitic capacitance, and thus, timings of the sensing signals and the display signals may not be easily changed.

SUMMARY

Embodiments of the present disclosure provide a display device and a driving method thereof, which can change timings of sensing signals and display signals while minimizing interference, using an existing control signal.

In accordance with an embodiment of the present disclosure, there is provided a display device including: pixels; a data driver configured to start outputting data voltages to at least some of the pixels at a first time during a horizontal period, and end outputting the data voltages at a second time during the horizontal period; sensors; and a sensor driver configured to change a logic level of a sensing signal of at least some of the sensors at a third time different from the first time and the second time during the horizontal period, wherein at least one of the first time, the second time, and the third time is changed according to a number of times a logic level of a vertical synchronization signal is changed while a logic level of a horizontal synchronization signal is maintained.

The horizontal period may be from a time at which the horizontal synchronization signal is changed from a first logic level to a second logic level to a next time at which the horizontal synchronization signal is changed from the first logic level to the second logic level, and the logic level of the horizontal synchronization signal may be the second logic level.

In the horizontal period, the vertical synchronization signal may be changed at least once from a third logic level to a fourth logic level, while the horizontal synchronization signal is maintained at the second logic level, and in the horizontal period, a period in which the vertical synchronization signal is maintained at the fourth logic level may be shorter than a period in which the horizontal synchronization signal is maintained at the second logic level.

In the horizontal period, the vertical synchronization signal may be maintained at the third logic level, while the horizontal synchronization signal is maintained at the first logic level.

The display device may further include a scan driver configured to output a scan signal having a turn-on level to at least some of the pixels from a fourth time to a fifth time during the horizontal period, wherein the logic level of the sensing signal is maintained from the second time to the fifth time.

An output period of the data voltages when the number of times the logic level of the vertical synchronization signal is changed is n times and an output period of the data voltages when the number of times the logic level of the vertical synchronization signal is changed is m times may have the same length and have different phases with respect to the horizontal period, and the n and the m may be different positive integers.

A level maintenance period of the sensing signal when the number of times the logic level of the vertical synchronization signal is changed is the n times and a level maintenance period of the sensing signal when the number of times the logic level of the vertical synchronization signal is changed is the m times may have the same length and have different phases with respect to the horizontal period.

An output period of the data voltages when the number of times the logic level of the vertical synchronization signal is changed is n times and an output period of the data voltages when the number of times the logic level of the vertical synchronization signal is changed is m times may have different lengths with respect to the horizontal period, and the n and the m may be different positive integers.

A level maintenance period of the sensing signal when the number of times the logic level of the vertical synchronization signal is changed is the n times and a level maintenance period of the sensing signal when the number of times the logic level of the vertical synchronization signal is changed is the m times may have different lengths with respect to the horizontal period.

The vertical synchronization signal may have a third logic level or a fourth logic level, and a frame period may be changed with respect to when the horizontal synchronization signal has the first logic level and the vertical synchronization signal has the fourth logic level.

In accordance with an embodiment of the present disclosure, there is provided a method for driving a display device, the method including: starting, by a data driver, outputting of data voltages to at least some pixels at a first time during a horizontal period, and ending outputting of the data voltages at a second time during the horizontal period; and changing, by a sensor driver, a logic level of a sensing signal of at least some sensors at a third time different from the first time and the second time during the horizontal period, wherein at least one of the first time, the second time, and the third time is changed according to a number of times a logic level of a vertical synchronization signal is changed while a logic level of a horizontal synchronization signal is maintained.

The horizontal period may be from a time at which the horizontal synchronization signal is changed from a first logic level to a second logic level to a next time at which the horizontal synchronization signal is changed from the first logic level to the second logic level, and the logic level of the horizontal synchronization signal may be the second logic level.

In the horizontal period, the vertical synchronization signal may be changed at least once from a third logic level to a fourth logic level, while the horizontal synchronization signal is maintained at the second logic level, and in the horizontal period, a period in which the vertical synchronization signal is maintained at the fourth logic level may be shorter than a period in which the horizontal synchronization signal is maintained at the second logic level.

In the horizontal period, the vertical synchronization signal may be maintained at the third logic level, while the horizontal synchronization signal is maintained at the first logic level.

The method may further include outputting a scan signal having a turn-on level to at least some of the pixels from a fourth time to a fifth time during the horizontal period, wherein the logic level of the sensing signal may be maintained from the second time to the fifth time.

An output period of the data voltages when the number of times the logic level of the vertical synchronization signal is changed is n times and an output period of the data voltages when the number of times the logic level of the vertical synchronization signal is changed is m times may have the same length and have different phases with respect to the horizontal period, and the n and the m may be different positive integers.

A level maintenance period of the sensing signal when the number of times the logic level of the vertical synchronization signal is changed is the n times and a level maintenance period of the sensing signal when the number of times the logic level of the vertical synchronization signal is changed is the m times may have the same length and different phases with respect to the horizontal period.

An output period of the data voltages when the number of times the logic level of the vertical synchronization signal is changed is n times and an output period of the data voltages when the number of times the logic level of the vertical synchronization signal is changed is m times may have different lengths with respect to the horizontal period, and the n and the m may be different positive integers.

A level maintenance period of the sensing signal when the number of times the logic level of the vertical synchronization signal is changed is the n times and a level maintenance period of the sensing signal when the number of times the logic level of the vertical synchronization signal is changed is the m times may have different lengths with respect to the horizontal period.

The vertical synchronization signal may have a third logic level or a fourth logic level, and a frame period may be changed with respect to when the horizontal synchronization signal has the first logic level and the vertical synchronization signal has the fourth logic level.

DETAILED DESCRIPTION OF THE EMBODIMENTS

Figure 1:
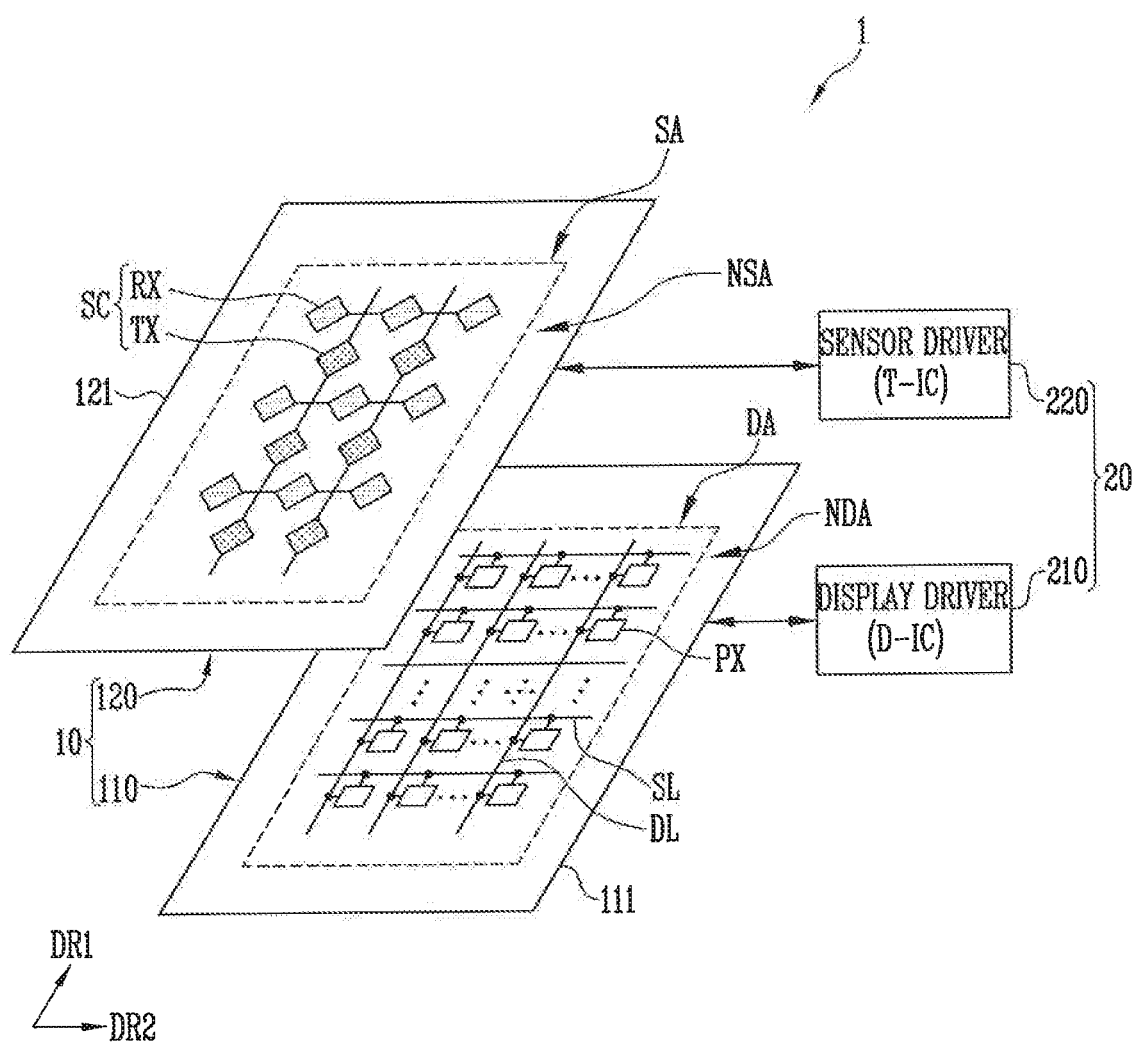
FIG. 1 is a diagram illustrating a display device in accordance with an embodiment of the present disclosure.

Example embodiments of the present disclosure will now be described more fully hereinafter with reference to the accompanying drawings; however, the present disclosure may be embodied in different forms and should not be construed as limited to the embodiments set forth herein.

In the drawings, dimensions may be exaggerated for clarity of illustration. In the following description, it will be understood that when an element is referred to as being "between" two elements, it can be the only element between the two elements, or one or more intervening elements may also be present. Like reference numerals may refer to like elements throughout.

In the following description, the expression "equal" may mean "substantially equal." In other words, this may mean equal to a degree to which those skilled in the art can understand the equality.

FIG. 1 is a diagram illustrating a display device in accordance with an embodiment of the present disclosure.

Referring to FIG. 1, the display device 1 in accordance with the embodiment of the present disclosure may include a panel 10 and a driving circuit 20 for driving the panel 10.

For example, the panel 10 may include a display unit 110 for displaying an image and a sensor unit 120 for sensing a touch, a pressure, a fingerprint, hovering, etc. For example, the panel 10 may include pixels PX and sensors SC that overlap at least some of the pixels PX. In an embodiment of the present disclosure, the sensors SC may include first sensors TX and second sensors RX. In another embodiment of the present disclosure (e.g., a self-capacitance method), the sensors SC may be configured with one kind of sensors without distinguishing the first and second sensors from each other. In other words, the sensors SC may all be of the same type. The driving circuit 20 may include a display driver 210 for driving the display unit 110 and a sensor driver 220 for driving the sensor unit 120. For example, the pixels PX may display an image by using a display frame period as a unit. For example, the sensors SC may sense an input of a user by using, as a unit, a sensing frame period shorter than the display frame period.

In some embodiments of the present disclosure, after the display unit 110 and the sensor unit 120 are manufactured separately from each other, the display unit 110 and the sensor unit 120 may be disposed and/or coupled to overlap each other in at least one area. Alternatively, in another embodiment of the present disclosure, the display unit 110 and the sensor unit 120 may be integrally manufactured. For example, the sensor unit 120 may be formed directly on at least one substrate (e.g., an upper substrate and/or a lower substrate of a display panel, or a thin film encapsulation layer), or another insulating layer or one of various types of functional layers (e.g., an optical layer or a protective layer), which constitutes the display unit 110.

Although a case where the sensor unit 120 is disposed on a front surface (e.g., an upper surface on which an image is displayed) of the display unit 110 is illustrated in FIG. 1, the position of the sensor unit 120 is not limited thereto. For example, in another embodiment of the present disclosure, the sensor unit 120 may be disposed on a rear surface or both surfaces of the display unit 110. In still another embodiment of the present disclosure, the sensor unit 120 may be disposed in at least one edge area of the display unit 110.

The display unit 110 may include a display substrate 111 and a plurality of pixels PX formed on the display substrate 111. The pixels PX may be disposed in a display area DA of the display substrate 111.

The display substrate 111 may include the display area DA in which an image is displayed and a non-display area NDA at the periphery of the display area DA. In some embodiments of the present disclosure, the display area DA may be disposed in a central area of the display unit 110, and the non-display area NDA is disposed in an edge area of the display unit 110 to surround or at least partially surround the display area DA.

The display substrate 111 may be a rigid substrate or a flexible substrate, and the material or property of the display substrate 111 is not particularly limited. For example, the display substrate 111 may be a rigid substrate made of glass or tempered glass, or a flexible substrate configured with a thin film made of plastic or metal.

Scan lines SL and data lines DL, and the pixels PX connected to the scan lines SL and the data lines DL are disposed in the display area DA. Pixels PX are selected by a scan signal having a turn-on level, which is supplied from the scan lines SL, to be supplied with a data signal supplied from the data lines DL, and emit light with a luminance corresponding to the data signal. Accordingly, an image corresponding to the data signal is displayed in the display area DA. In the present disclosure, the structure, the driving method, and the like of the pixels PX are not particularly limited. For example, each of the pixels PX may be implemented as a pixel having various structures and/or various driving methods.

Various types of lines and/or a built-in circuit, connected to the pixels PX of the display area DA may be disposed in the non-display area NDA. For example, a plurality of lines for supplying various power sources and various control signals to the display area DA may be disposed in the non-display area NDA. In addition, a scan driver and the like may be further disposed in the non-display area NDA.

In the present disclosure, the kind of the display unit 110 is not particularly limited. For example, the display unit 110 may be implemented as a self-luminescent display panel such as an organic light emitting display panel. However, when the display unit 110 is a self-luminescent display panel, each pixel PX is not necessarily limited to a case where the pixel PX includes only an organic light emitting element. For example, a light emitting element of each pixel PX may be configured as an organic light emitting diode, an inorganic light emitting diode, a quantum dot/well light emitting diode, etc. A plurality of light emitting elements may be provided in each pixel PX. The plurality of light emitting elements may be connected in series, parallel, series/parallel, etc. Alternatively, the display unit 110 may be implemented as a non-light emitting display panel such as a liquid crystal display panel. When the display unit 110 is a non-light emitting display panel, the display device 1 may additionally include a light source such as a back-light unit.

The sensor unit 120 may include a sensor substrate 121 and a plurality of sensors SC formed on the sensor substrate 121. The sensors SC may be disposed in a sensing area SA on the sensor substrate 121.

The sensor substrate 121 may include the sensing area SA capable of sensing a touch input or the like and a peripheral area NSA at the periphery of the sensing area SA. In some embodiments of the present disclosure, the sensing area SA may overlap with at least one area of the display area DA. For example, the sensing area SA may correspond to the display area DA (e.g., an area overlapping the display area DA), and the peripheral area NSA may correspond to the non-display area NDA (e.g., an area overlapping the non-display area NDA). When a touch input or the like is provided on the display area DA, the touch input may be detected through the sensor unit 120.

The sensor substrate 121 may be a rigid or flexible substrate. In addition, the sensor substrate 121 may be configured with at least one insulating layer. Further, the sensor substrate 121 may be a transparent or translucent light transmission substrate, but the present disclosure is not limited thereto. In other words, in the present disclosure, the material and property of the sensor substrate 121 are not particularly limited. For example, the sensor substrate 121 may be a rigid substrate configured with glass or tempered glass, or a flexible substrate configured with a thin film made of plastic or metal. In some embodiments of the present disclosure, at least one substrate (e.g., the display substrate 111, an encapsulation substrate, and/or a thin film encapsulation layer) constituting the display unit 110 or, at least one insulating layer or at least one functional layer, disposed at the inside and/or an outer surface of the display unit 110 may be used as the sensor substrate 121.

The sensing area SA is an area capable of reacting with a touch input (e.g., an active area of sensors). To accomplish this, sensors SC for sensing a touch input or the like may be disposed in the sensing area SA. In some embodiments of the present disclosure, the sensors SC may include the first sensors TX and the second sensors RX.

For example, each of the first sensors TX may extend in a first direction DR1. The first sensors TX may be arranged in a second direction DR2. The second direction DR2 may be different from the first direction DR1. For example, the second direction DR2 may be a direction orthogonal to the first direction DR1. In another embodiment of the present disclosure, the extending direction and arrangement direction of the first sensors TX may have another configuration. Each of the first sensors TX may have a form in which first cells having a relatively wide area and first bridges having a relatively narrow area are connected to each other. Although a case where each of the first cells has a diamond shape is illustrated in FIG. 1, each of the first cells may be configured in various shapes including a circular shape, a quadrangular shape, a triangular shape, a mesh shape, and the like. For example, the first bridges may be integrally formed with the first cells on the same layer. In another embodiment of the present disclosure, the first bridges may be formed in a layer different from that of the first cells, to electrically connect adjacent first cells to each other.

For example, each of the second sensors RX may extend in the second direction DR2. The second sensors RX may be arranged in the first direction DR1. In another embodiment of the present disclosure, the extending direction and arrangement direction of the second sensors RX may follow another configuration. Each of the second sensors RX may have a form in which second cells having a relatively wide area and second bridges having a relatively narrow area are connected to each other. Although a case where each of the second cells has a diamond shape is illustrated in FIG. 1, each of the first cells may be configured in various shapes including a circular shape, a quadrangular shape, a triangular shape, a mesh shape, and the like. For example, the second bridges may be integrally formed with the second cells on the same layer. In another embodiment of the present disclosure, the second bridges may be formed in a layer different from that of the second cells, to electrically connect adjacent second cells to each other.

In some embodiments of the present disclosure, each of the first sensors TX and the second sensors RX may include at least one of a metal material, a transparent conductive material, and various other conductive materials, thereby having conductivity. For example, the first sensors TX and the second sensors RX may include at least one of various metal materials including gold (Au), silver (Ag), aluminum (Al), molybdenum (Mo), chromium (Cr), titanium (Ti), nickel (Ni), neodymium (Nd), copper (Cu), platinum (Pt), and the like, or alloys thereof. The first sensors TX and the second sensors RX may be configured in a mash shape. In addition, the first sensors TX and the second sensors RX may include at least one of various transparent conductive materials including silver nano wire (AgNW), Indium Tin Oxide (ITO), Indium Zinc Oxide (IZO), Indium Gallium Zinc Oxide (IGZO), Antimony Zinc Oxide (AZO), Indium Tin Zinc Oxide (ITZO), Zinc Oxide (ZnO), Tin Oxide (SnO$_2$), carbon nano tube, graphene, and the like. In addition, the first sensors TX and the second sensors RX may include at least one of various conductive materials, thereby having conductivity. Further, each of the first sensors TX and the second sensors RX may be configured as a single layer or a multi-layer, and its sectional structure is not particularly limited.

Further, sensor lines for electrically connecting the first and second sensors TX and RX to the sensor driver 220, and the like may be concentrically disposed in the peripheral area NSA.

The driving circuit 20 may include the display driver 210 for driving the display unit 110 and the sensor driver 220 for driving the sensor unit 120. In an embodiment of the present disclosure, the display driver 210 and the sensor driver 220 may be configured as Integrated Chips (ICs) separate from each other. In another embodiment of the present disclosure, at least a portion of the display driver 210 and at least a portion of the sensor driver 220 may be integrated together in one IC.

The display driver 210 is electrically connected to the display unit 110 to drive the pixels PX. For example, the display driver 210 may include a data driver 12 and a timing controller 11, and a scan driver 13 may be separately mounted in the non-display area NDA of the display unit 110 (see FIG. 9). In another embodiment of the present disclosure, the display driver 210 may include all or at least a portion of the data driver 12, the timing controller 11, and the scan driver 13.

The sensor driver 220 is electrically connected to the sensor unit 120 to drive the sensor unit 120. The sensor driver 220 may include a sensor transmitter and a sensor receiver. In some embodiments of the present disclosure, the sensor transmitter and the sensor receiver may be integrated in one IC, but the present disclosure is not limited thereto.

Figure 2:
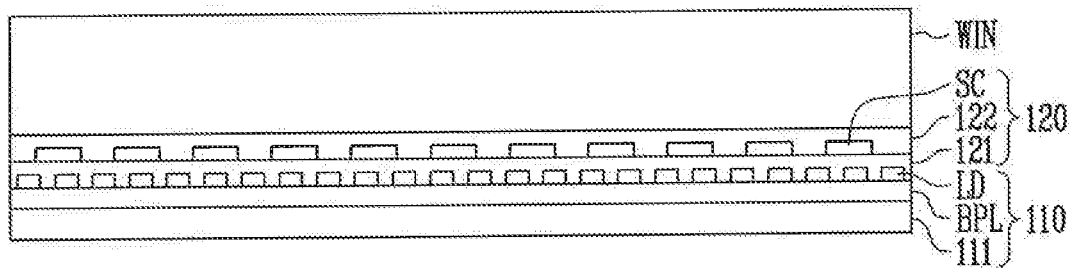
FIG. 2 is a diagram illustrating an example stacked structure of the display device shown in FIG. 1.

FIG. 2 is a diagram illustrating an example stacked structure of the display device shown in FIG. 1.

Referring to FIG. 2, for example, the sensor unit 120 may be stacked on the top of the display unit 110, and a window WIN may be stacked on the top of the sensor unit 120.

The display unit 110 may include a display substrate 111, a circuit element layer BPL formed on the display substrate 111, and light emitting elements LD formed on the circuit element layer BPL. The circuit element layer BPL may include pixel circuits for driving light emitting elements LD of pixels PX, scan lines SL, data lines DL, and the like.

The sensor unit 120 may include a sensor substrate 121, sensors SC formed on the sensor substrate 121, and a protective layer 122 covering the sensors SC. In the embodiment shown in FIG. 2, the sensor substrate 121 may be illustrated in the form of an encapsulation layer covering the pixels PX. In another embodiment of the present disclosure, the sensor substrate 121 may be separate from the encapsulation layer covering the pixels PX.

The window WIN is a protective member disposed at the uppermost end of the display device 1, and may be a transparent light transmission substrate. The window WIN may have a multi-layered structure selected from a glass substrate, a plastic film, and a plastic substrate. The window WIN may include a rigid or flexible material, and the material constituting the window WIN is not particularly limited.

The display device 1 may further include a polarizing plate (or anti-reflection layer) for preventing reflection of external light between the window WIN and the sensor unit 120.

Figure 3:
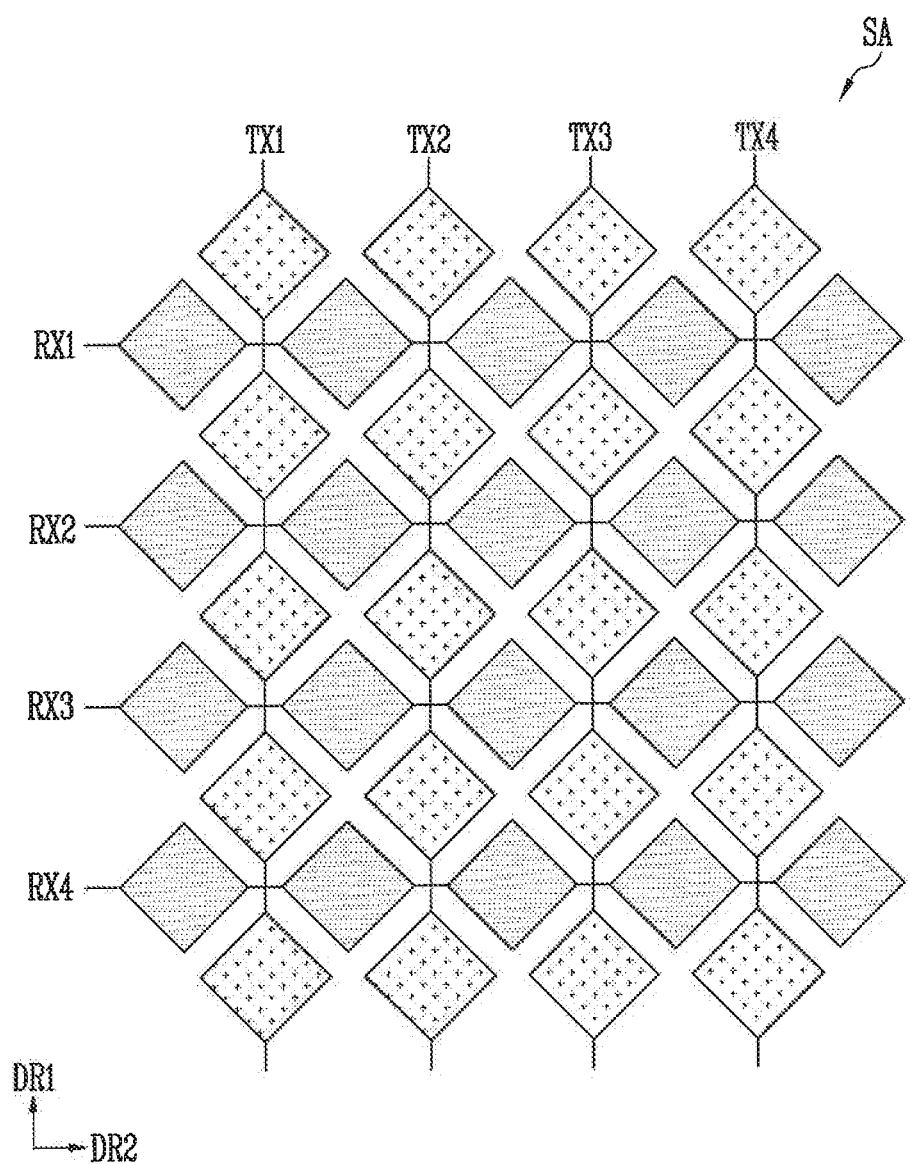
FIG. 3 is a diagram illustrating first sensors and second sensors in accordance with an embodiment of the present disclosure.

FIG. 3 is a diagram illustrating first sensors and second sensors in accordance with an embodiment of the present disclosure.

Referring to FIG. 3, first sensors TX1, TX2, TX3, and TX4 and second sensors RX1, RX2, RX3, and RX4, which are located in the sensing area SA, are illustrated. For convenience of description, it is assumed that four first sensors TX1 to TX4 and four second sensors RX1 to RX4 are disposed in the sensing area SA.

Descriptions of the first sensors TM1 to TX4 and the second sensors RX1 to RX4 are identical to those of the first sensors TX and the second sensors RX, which are shown in FIG. 1, and therefore, overlapping descriptions will be omitted.

Figure 4:
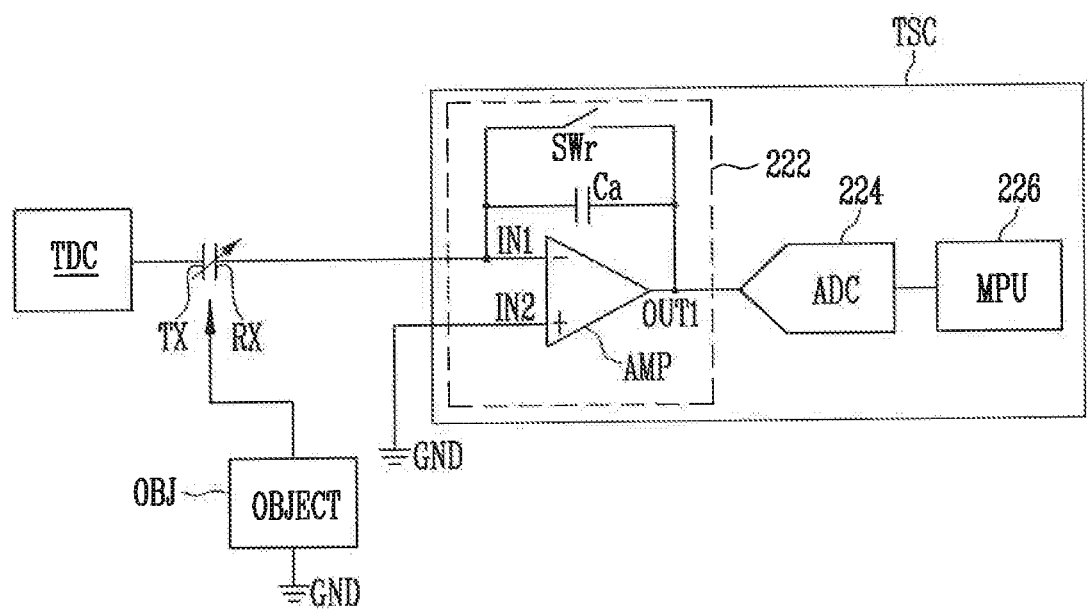
FIGS. 4 and 5 are diagrams illustrating a mutual sensing period in accordance with an embodiment of the present disclosure.
Figure 5:
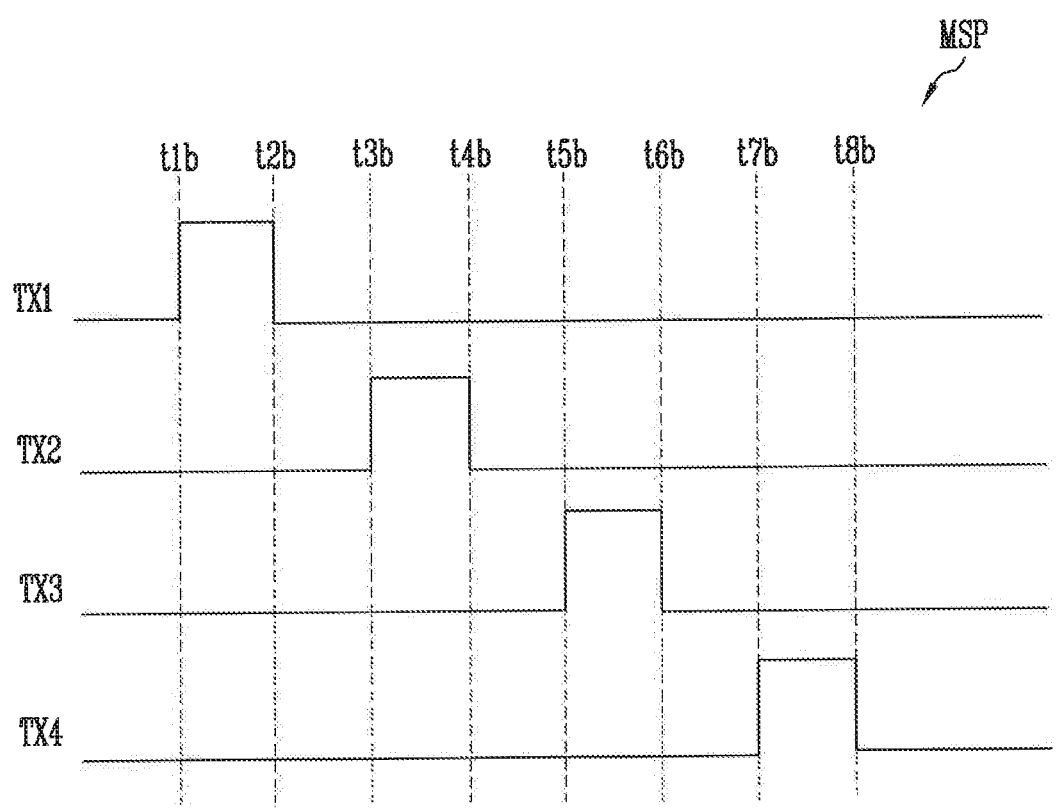

FIGS. 4 and 5 are diagrams illustrating a mutual sensing period in accordance with an embodiment of the present disclosure.

The mutual sensing period MSP may be a period in which the sensor unit 120 and the sensor driver 220 are driven in a mutual capacitance mode. In FIG. 4, a configuration of the sensor unit 120 and the sensor driver 220 will be illustrated based on any one sensor channel 222.

The sensor driver 220 may include a sensor receiver TSC and a sensor transmitter TDC. In the mutual sensing period MSP, the sensor transmitter TDC may be connected to the first sensors TX, and the sensor receiver TSC may be connected to the second sensors RX.

The sensor receiver TSC may include an operational amplifier AMP, an analog-digital converter 224, and a processor 226. For example, each sensor channel 222 may be implemented as an analog front end (AFE) including at least one operational amplifier AMP. The analog digital converter 224 and the processor 226 may be provided for each sensor channel 222, and be shared by a plurality of sensor channels 222.

A first input terminal IN1 of the operational amplifier AMP may be connected to a corresponding second sensor RX, and a second input terminal IN2 of the operational amplifier AMP may be connected to a reference power source GND. For example, the first input terminal IN1 may be an inverting terminal, and the second input terminal IN2 may be a non-inverting terminal. The reference power source GND may be a ground voltage or a voltage having a specific magnitude.

The analog digital converter 224 may be connected to an output terminal OUT1 of the operational amplifier AMP. A capacitor Ca and a switch SWr may be connected in parallel to each other between the first input terminal IN1 and the output terminal OUT1.

Referring to FIG. 5, during the mutual sensing period MSP, the sensor driver 220 (e.g., the sensor transmitter TDC) may sequentially supply first transition signals to the first sensors TX1 to TX4. In other words, sensing signals of the first sensors TX1 to TX4 may include the first transition signals. For example, first transition signals may be supplied twice to the first sensor TX1 (t1b and t2b), first transition signals may be supplied twice to the first sensor TX2 (t3b and t4b), first transition signals may be supplied twice to the first sensor TX3 (t5b and t6b), and first transition signals may be supplied twice to the first sensor TX4 (t7b and t8b). In some embodiments of the present disclosure, a number of times first transition signals are supplied each of the first sensors TX1 to TX4 may be greater than twice.

Each of the first transition signals may correspond to a rising transition and/or a falling transition. For example, a first transition signal at a time t1b may correspond to the rising transition. In other words, the transition signal at the time t1b may rise from a low level to a high level. A first transition signal at a time t2b may correspond to the falling transition. In other words, the first transition signal at the time t2b may fall from the high level to the low level. Similarly, a first transition signal at a time t3b may correspond to the rising transition, and a first transition signal at a time t4b may correspond to the falling transition.

The sensor receiver TSC may include a plurality of sensor channels 222 connected to a plurality of second sensors RX. Each of the sensor channels 222 may receive first sampling signals corresponding to the first transition signals from a corresponding second sensor RX. For example, the sensor channels 222 connected to the second sensors RX1 to RX4 may independently receive the first sampling signals, corresponding to the first transition signal applied to the first sensor TX1 at the time t1b. In addition, the sensor channels 222 connected to the second sensors RX1 to RX4 may independently receive the first sampling signals, corresponding to the first transition signal applied to the first sensor TX1 at the time t2b.

On the sensing area SA, mutual capacitances between the first sensors TX1 to TX4 and the second sensors RX1 to RX4 may be different from each other according to the position of an object OBJ such as a finger of a user, and accordingly, the first sampling signals received by the sensor channels 222 may be different from each other.

The sensor channel 222 may generate an output signal corresponding to a voltage difference between the first and second input terminals IN1 and IN2. For example, the sensor channel 222 may amplify and output a difference voltage between the first and second input terminals IN1 and IN2 to a degree corresponding to a predetermined gain.

In some embodiments of the present disclosure, the sensor channel 222 may be implemented as an integrator. The capacitor Ca and the switch SWr may be connected in parallel to each other between the first input terminal IN1 and the output terminal OUT1 of the operational amplifier AMP. For example, the switch SWr may be turned on before a first sampling signal is received, so that charges of the capacitor Ca are initialized. The switch SWr may be in a turn-off state when the first sampling signal is received.

The analog-digital converter 224 converts an analog signal input from each of the sensor channels 222 into a digital signal. The processor 226 may detect a user input by analyzing the digital signal.

Figure 6:
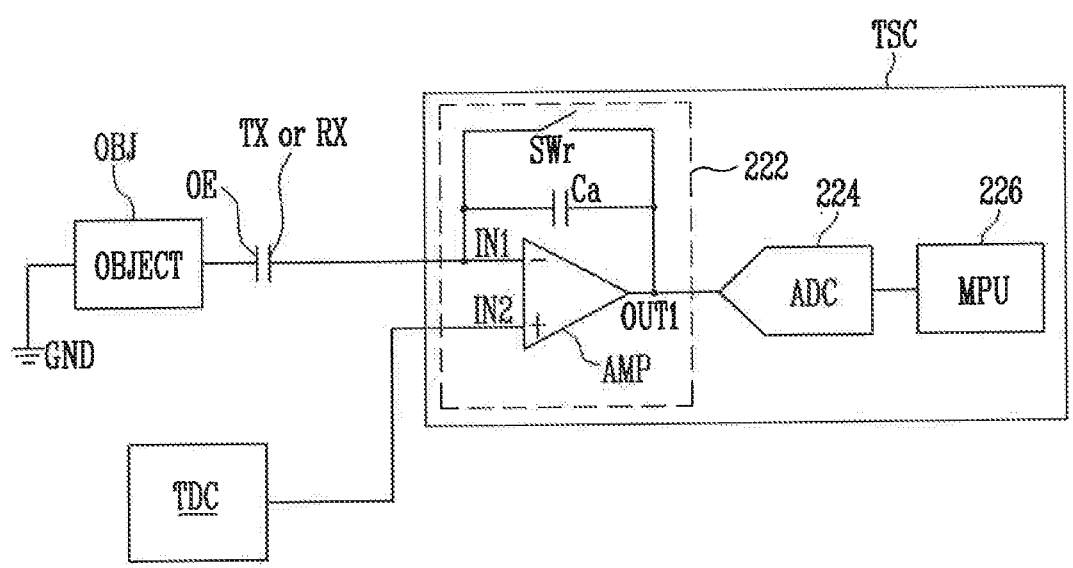
FIGS. 6, 7 and 8 are diagrams illustrating a first self-sensing period and a second self-sensing period in accordance with an embodiment of the present disclosure.
Figure 7:
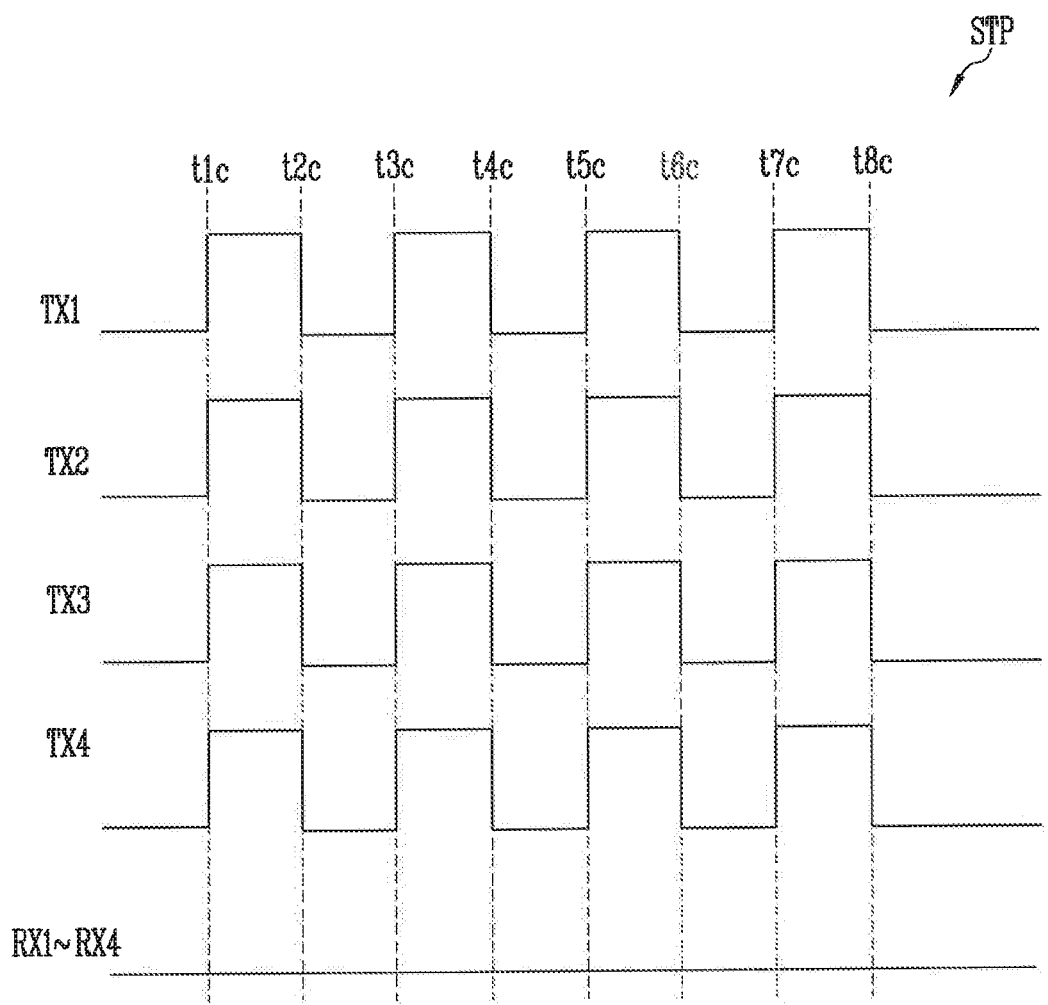
Figure 8:
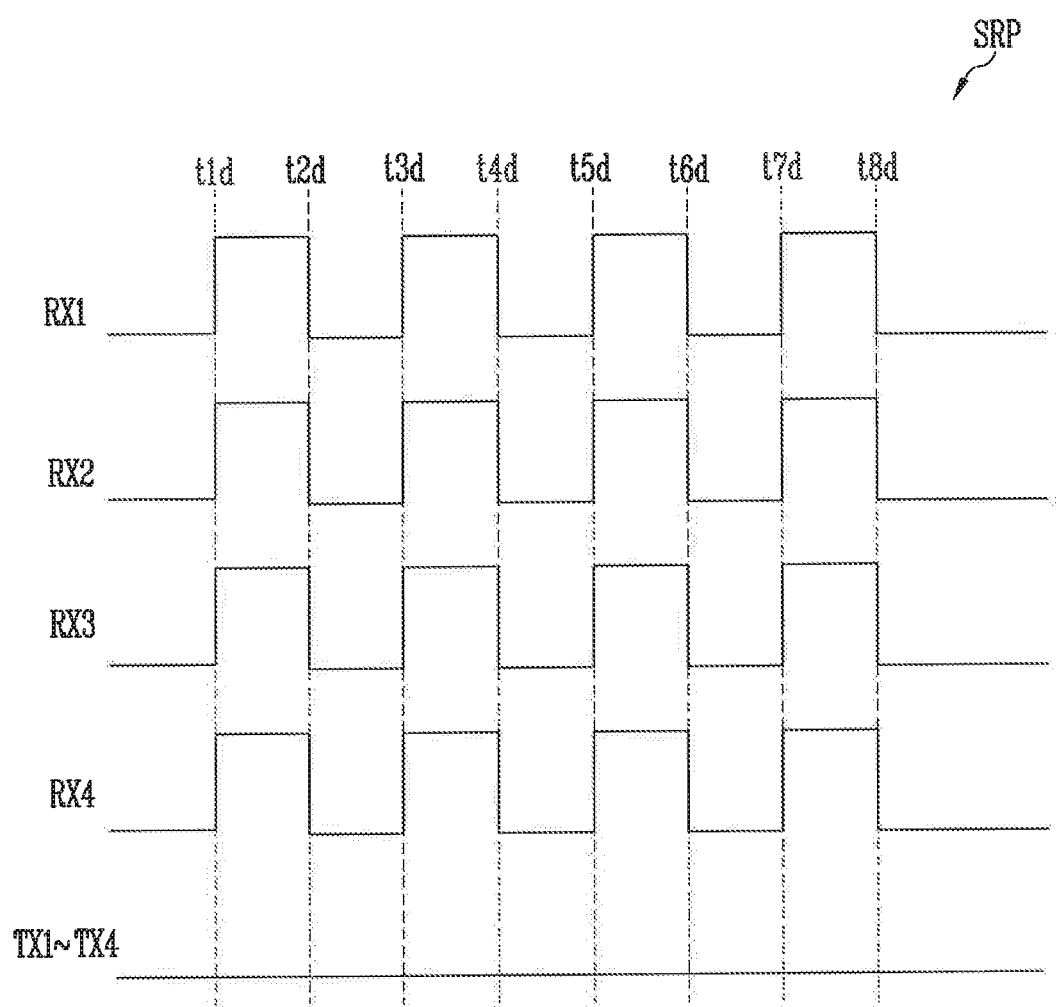

FIGS. 6 to 8 are diagrams illustrating a first self-sensing period and a second self-sensing period in accordance with an embodiment of the present disclosure.

In FIG. 6, a configuration of the sensor unit 120 and the sensor driver 220 will be illustrated based on any one sensor channel 222. An internal configuration of a sensor receiver TSC and a sensor transmitter TDC may be substantially identical to the case shown in FIG. 4, and therefore, overlapping descriptions will be omitted. Hereinafter, portions different from the case shown in FIG. 4 will be mainly described.

Referring to FIG. 7, the first self-sensing period STP may be a period in which the sensor unit 120 and the sensor driver 220 are driven in a self-capacitance mode. In the first self-sensing period STP, the sensor transmitter TDC may be connected to a second input terminal IN2 of each sensor channel 222, and a corresponding first sensor TX may be connected to a first input terminal IN1 of each sensor channel 222. In another embodiment of the present disclosure, the sensor transmitter TDC may be connected to the first input terminal IN1. A reference voltage or a ground voltage may be applied to the second input terminal IN2.

For example, during the first self-sensing period STP, the sensor transmitter TDC may supply a second transition signal to the second input terminal IN2 of each sensor channel 222. The second transition signal may be supplied to the first sensor TX connected to the first input terminal IN1 according to characteristics of an operational amplifier AMP. In other words, sensing signals of the first sensors TX1 to TX4 may include second transition signals. In an embodiment of the present disclosure, the sensor driver 220 may simultaneously supply the second transition signals to the first sensors TX1 to TX4 during the first self-sensing period STP. For example, referring to FIG. 7, the second transition signals may be simultaneously supplied to the first sensors TX1 to TX4 at each of times t1c, t2c, t3c, t4c, t5c, t6c, t7c, and t8c. The second sensors RX1 to RX4 may receive a separate reference voltage, or be in a floating state. Each of the second transition signals may correspond to a rising transition and/or a falling transition.

The first sensors TX1 to TX4 may have a self-capacitance. When an object OBJ such as a finger of a user comes close to the first sensors TX1 to TX4, the self-capacitance of the first sensors TX1 to TX4 may be changed according to a capacitance formed on an object surface OE. The second transition signal on which the self-capacitance is reflected may be referred to as a second sampling signal. A touch position of the object OBJ in the second direction DR2 may be detected by using a difference between second sampling signals with respect to the first sensors TX1 to TX4 (see FIG. 3).

Referring to FIG. 8, the second self-sensing period SRP may be a period in which the sensor unit 120 and the sensor driver 220 are driven in a self-capacitance mode. In the second self-sensing period SRP, the sensor transmitter TDC may be connected to the second input terminal IN2 of each sensor channel 222, and a corresponding second sensor RX may be connected to the first input terminal IN1 of each sensor channel 222.

For example, during the second self-sensing period SRP, the sensor transmitter TDC may supply a third transition signal to the second input terminal IN2 of each sensor channel 222. The third transition signal may be supplied to the second sensor RX connected to the first input terminal IN1 according to characteristics of the operational amplifier AMP. In other words, sensing signals of the first sensors TX1 to TX4 may include third transition signals. In an embodiment of the present disclosure, the sensor driver 220 may simultaneously supply the third transition signals to the second sensors RX1 to RX4 during the second self-sensing period SRP. For example, referring to FIG. 8, the third transition signals may be simultaneously supplied to the second sensors RX1 to RX4 at each of times t1$d$, t2$d$, t3$d$, t4$d$, t5$d$, t6$d$, t7$d$, and t8$d$. The first sensors TX1 to TX4 may receive a separate reference voltage, or be in a floating state. Each of the third transition signals may correspond to a rising transition and/or a falling transition.

The second sensors RX1 to RX4 may have a self-capacitance. When an object OM such as a finger of a user comes close to the second sensors RX1 to RX4, the self-capacitance of the second sensors RX1 to RX4 may be changed according to a capacitance formed on an object surface OE. The third transition signal on which the self-capacitance is reflected may be referred to as a third sampling signal. A touch position of the object QBJ in the first direction DR1 may be detected by using a difference between third sampling signals with respect to the second sensors RX1 to RX4 (see FIG. 3).

Figure 9:
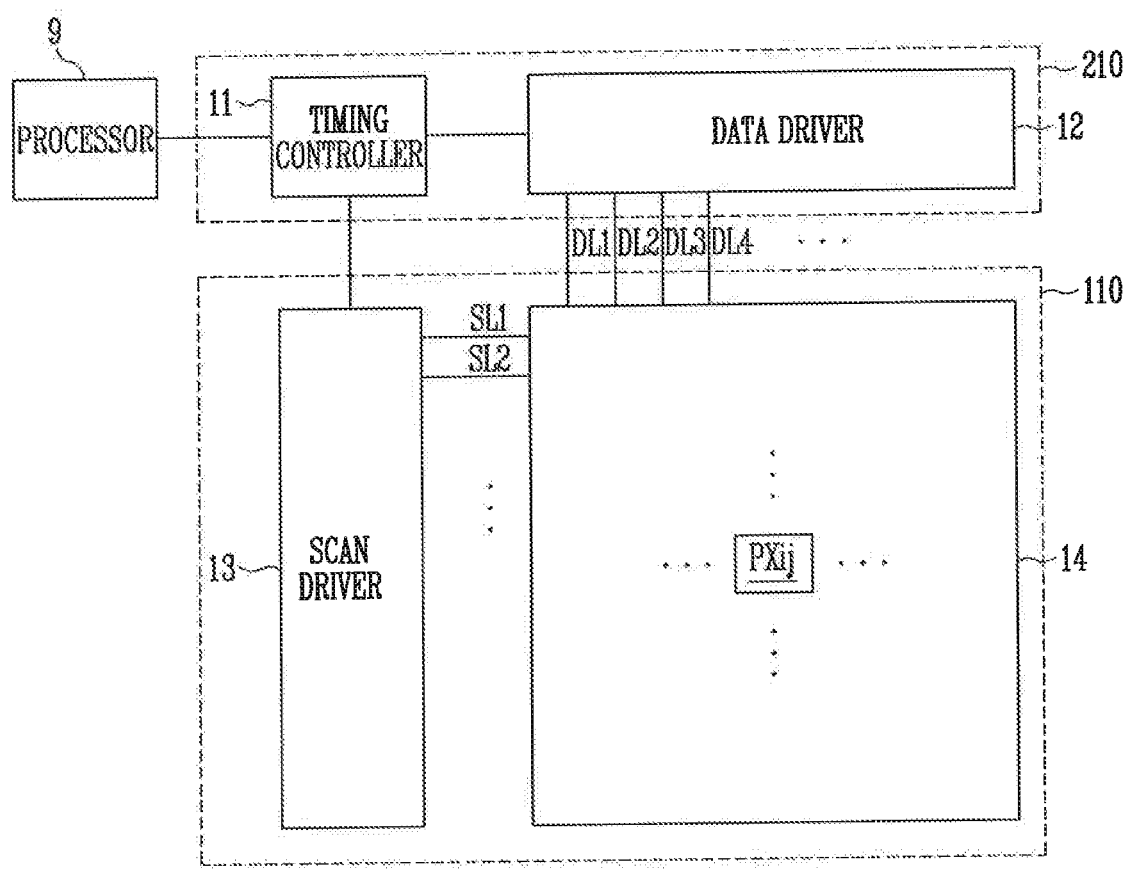
FIG. 9 is a diagram illustrating a display unit and a display driver in accordance with an embodiment of the present disclosure.

FIG. 9 is a diagram illustrating a display unit and a display driver in accordance with an embodiment of the present disclosure.

Referring to FIG. 9, the display driver 210 may include a data driver 12 and a timing controller 11, and the display unit 110 may include a scan driver 13 and a pixel unit 14. However, as described above, whether functional units are to be integrated in one IC, to be integrated in a plurality of ICs, or to be mounted on the display substrate 111 may be variously configured according to specifications of the display device 1.

The timing controller 11 may receive grayscales for each frame period and control signals from a processor 9. The processor 9 may correspond to at least one of a Graphics Processing Unit (GPU), a Central Processing Unit (CPU), an Application Processor (AP), and the like. The control signals may include a vertical synchronization signal, a horizontal synchronization signal, a data enable signal, and the like. The data enable signal may have an enable level (e.g., a logic high level) while grayscales are supplied from the processor 9, and have a disable level (e.g., a logic low level) while the grayscales are not supplied. The vertical synchronization signal and the horizontal synchronization signal will be described later with reference to FIG. 11.

The timing controller 11 may render grayscales to correspond to the specifications of the display device 1. For example, the processor 9 may provide a red grayscale, a green grayscale, and a blue grayscale with respect to each unit dot. For example, when the pixel unit 14 has an RGB stripe structure, pixels may correspond one-to-one to the respective grayscales. Therefore, it may be unnecessary to render the grayscales. However, for example, when the pixel unit 14 has a PENTILE™ structure, adjacent unit dots share a pixel with each other, and hence the pixels may not correspond one-to-one to the respective grayscales. Therefore, it may be necessary to render the grayscales. Grayscales which are rendered or are not rendered may be provided to the data driver 12. In addition, the timing controller 11 may provide a data control signal to the data driver 12. Further, the timing controller 11 may provide a scan control signal to the scan driver 13.

The data driver 12 may generate data voltages to be provided to data lines DL1, DL2, DL3, DL4, . . . by using the grayscales and the data control signal, which are received from the timing controller 11.

The scan driver 13 may generate scan signals to be provided to is scan lines SL1, SL2, . . . by using a clock signal, a scan start signal, and the like, which are received from the timing controller 11. The scan driver 13 may sequentially supply the scan signals having a pulse of a turn-on level to the scan lines SL1, SL2, . . . . For example, the scan driver 13 may supply the scan signals having the turn-on level to the scan lines SL1, SL2, . . . in a cycle corresponding to that of the horizontal synchronization signal during an active period in which grayscales are supplied. The scan driver 13 may include scan stages configured in the form of shift registers. The scan driver 13 may generate the scan signals in a manner that sequentially transfers the scan start signal in the form of a pulse of the turn-on level to a next scan stage under the control of the clock signal.

The pixel unit 14 includes pixels. Each of the pixels may be connected to a corresponding one of the data lines DL1, DL2, DL3, DL4, . . . and a corresponding one of the scan lines SL1, SL2, . . . . For example, a pixel PXij may be connected to an ith scan line and a jth data line. The pixels may include pixels emitting light of a first color, pixels emitting light of a second color, and pixels emitting light of a third color. The first color, the second color, and the third color may be different colors. For example, the first color may be one color among red, green, and blue, the second color may be one color except the first color among red, green, and blue, and the third color may be the other color except the first color and the second color among red, green, and blue. In addition, magenta, cyan, and yellow instead of red, green, and blue may be used as the first to third colors.

Figure 10:
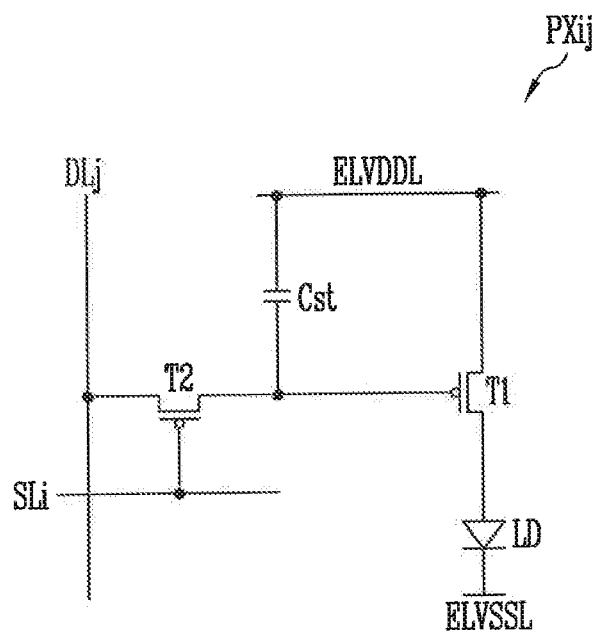
FIG. 10 is a diagram illustrating a pixel in accordance with an embodiment of the present disclosure.

FIG. 10 is a diagram illustrating a pixel in accordance with an embodiment of the present disclosure.

Referring to FIG. 10, an example pixel PXij is illustrated. The other pixels may also have a configuration substantially identical to that of the pixel PXij, and therefore, overlapping descriptions will be omitted.

A gate electrode of a transistor T1 may be connected to a second electrode of a storage capacitor Cst, a first electrode of the transistor T1 may be connected to a first power line ELVDDL, and a second electrode of the transistor T1 may be connected to an anode of a light emitting element LD. Hereinafter, the transistor T1 may be referred to as a driving transistor.

A gate electrode of a transistor T2 may be connected to an ith scan line SLi, a first electrode of the transistor T2 may be connected to a jth data line DLj, and a second electrode of the transistor T2 may be connected to the second electrode of the storage capacitor Cst. Hereinafter, the transistor T2 may be referred to as a scan transistor.

A first electrode of the storage capacitor Cst may be connected to the first power line ELVDDL, and the second electrode of the storage capacitor Cst may be connected to the gate electrode of the transistor T1.

The anode of the light emitting element LD may be connected to the second electrode of the transistor T1, and a cathode of the light emitting element LD may be connected to a second power line ELVSSL. The light emitting element LD may be a light emitting diode. As described above, the light emitting element of each pixel PX may be configured as an organic light emitting element, an inorganic light emitting element, a quantum dot/well light emitting element, or the like. A plurality of light emitting elements may be connected in series, parallel, series/parallel, etc. During an emission period of the light emitting element LD, a first power voltage applied to the first power line ELVDDL may be higher than a second power voltage of the second power line ELVSSL.

The transistors T1 and T2 may be implemented with a P-type transistor, but at least one transistor may be used as an N-type transistor by reversing the phase of a signal.

When a scan signal having a turn-on level is applied to the ith scan line SLi, the transistor T2 may be turned on. A data voltage charged in the jth data line DLj may be stored in the storage capacitor Cst. The transistor T1 may allow a driving current to flow corresponding to a gate-source voltage difference maintained by the storage capacitor Cst. The driving current may flow through a path of the first power line ELVDDL, the transistor T1, the light emitting element LD, and the second power line ELVSSL. The light emitting element LD may emit light with a luminance corresponding to an amount of the driving current.

Figure 11:
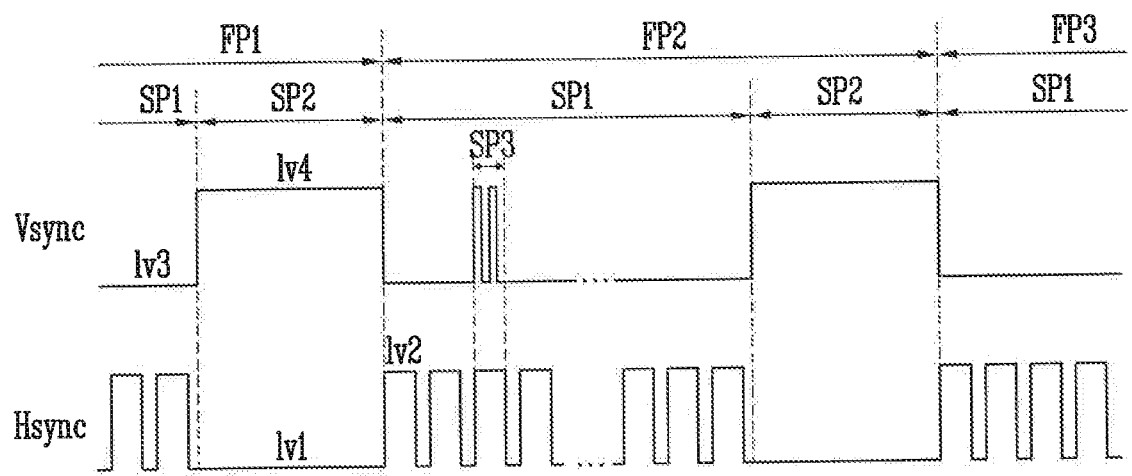
FIG. 11 is a diagram illustrating frame periods in accordance with an embodiment of the present disclosure.

FIG. 11 is a diagram illustrating frame periods in accordance with an embodiment of the present disclosure.

Referring to FIG. 11, consecutive frame periods FP1, FP2, and FP3 are illustrated. Each of the frame periods FP1, FP2, and FP3 may include a first period SP1 and a second period SP2. The first period SP1 may be a period (e.g., an active period) in which grayscales corresponding to one frame are supplied from the processor 9. The second period SP2 may be a period (e.g., a blank period) in which any grayscales are not supplied from the processor 9, and correspond to a transition period between a current frame and a next frame.

In FIG. 11, a second period SP2 occurs after a first period SP1 in each of the frame periods FP1, FP2, and FP3. However, in another embodiment of the present disclosure, each of the frame periods FP1, FP2, and FP3 may be defined such that a first period SP1 occurs after a second period SP2. In still another embodiment of the present disclosure, each of the frame periods FP1, FP2, and FP3 may be defined such that a first period SP1 occurs after a second half of a second period SP2 and a first half of a next second period SP2 occurs after the first period SP1.

A horizontal synchronization signal Hsync may have a first logic level Iv1 or a second logic level Iv2. A vertical synchronization signal Vsync may have a third logic level Iv3 or a fourth logic level Iv4. In the following drawings, each of the first logic level Iv1 and the third logic level Iv3 is illustrated as a logic low level, and each of the second logic level Iv2 and the fourth logic level Iv4 is illustrated as a logic high level. However, in another embodiment of the present disclosure, each of the logic levels Iv1, Iv2, Iv3, and Iv4 may be differently defined.

The first period SP1 and the second period SP2 may be distinguished from each other through logic levels of the vertical synchronization signal Vsync and the horizontal synchronization signal Hsync. For example, in the second period SP2, the horizontal synchronization signal Hsync may have the first logic level Iv1 and the vertical synchronization signal Vsync may have the fourth logic level Iv4. In other words, a frame period may be changed based on when the horizontal synchronization signal Hsync has the first logic level Iv1 and the vertical synchronization signal Vsync has the fourth logic level Iv4. In the second period SP2, the logic level of each of the vertical synchronization signal Vsync and the horizontal synchronization signal Hsync is not changed but may be maintained. A length of the second period SP2 may be shorter than that of the first period SP1. The length of the second period SP2 may be longer than one cycle of the horizontal synchronization signal Hsync.

In the first period SP1, the logic level of the horizontal synchronization signal Hsync may be changed. For example, the logic level of the horizontal synchronization signal Hsync may be in a constant cycle. In other words, horizontal synchronization signal Hsync may be toggled. One cycle of the horizontal synchronization signal Hsync may correspond to one horizontal period.

In the first period SP1, the logic level of the vertical synchronization signal Vsync may be changed or may not be changed. For example, in a first period SP1 of a first frame period FP1, the logic level of the vertical synchronization signal Vsync is not changed but may be maintained. When the logic level of the vertical synchronization signal Vsync is not changed in the first period SP1, the vertical synchronization signal Vsync may maintain the third logic level Iv3. In other words, in the first period SP1 of the first frame period FP1, the logic level of the vertical synchronization signal Vsync may remain low.

For example, in a first period SP1 of a second frame period FP2, the logic level of the vertical synchronization signal Vsync may be changed. For example, the logic level of the vertical synchronization signal Vsync may be changed in a third period SP3 during the first period SP1 of the second frame period FP2. The third period SP3 may correspond to a period in which the horizontal synchronization signal Hsync has the second logic level Iv2.

The third period SP3 may be a period indicating a current mode of the display device 1. For example, when the mode of the display device 1 is changed, the third period SP3 may be inserted during the first period SP1 as illustrated in the embodiment shown in FIG. 11. In addition, unlike the embodiment shown in FIG. 11, the third period SP3 may exist for every one horizontal period. Although the mode of the display device 1 is not changed, current mode information may be continuously provided for every one horizontal period. Hereinafter, one horizontal period including the third period SP3 will be described with reference to FIGS. 12 to 14.

Figure 12:
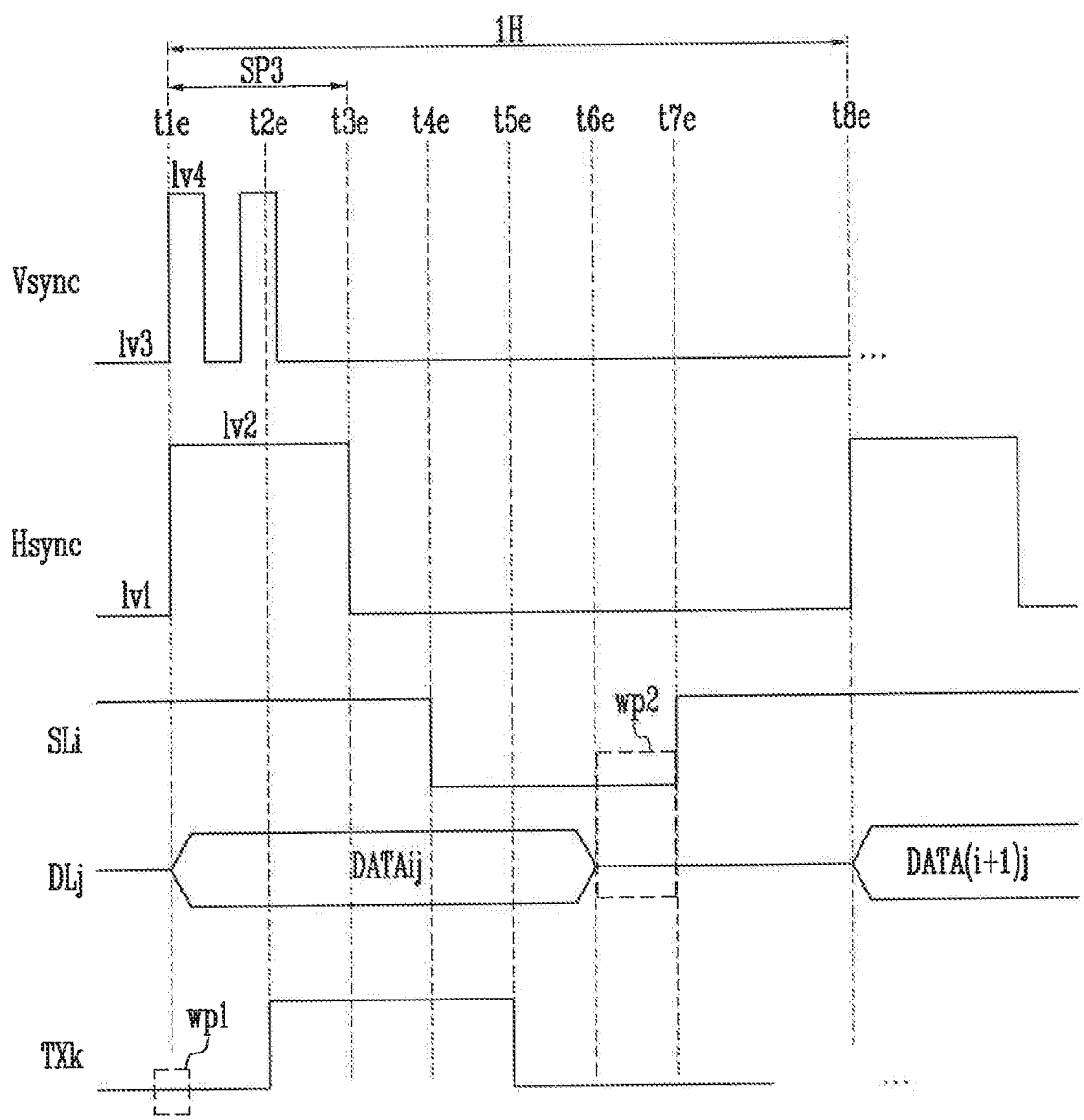
FIGS. 12, 13 and 14 are diagrams illustrating horizontal periods in accordance with an embodiment of the present disclosure.
Figure 13:
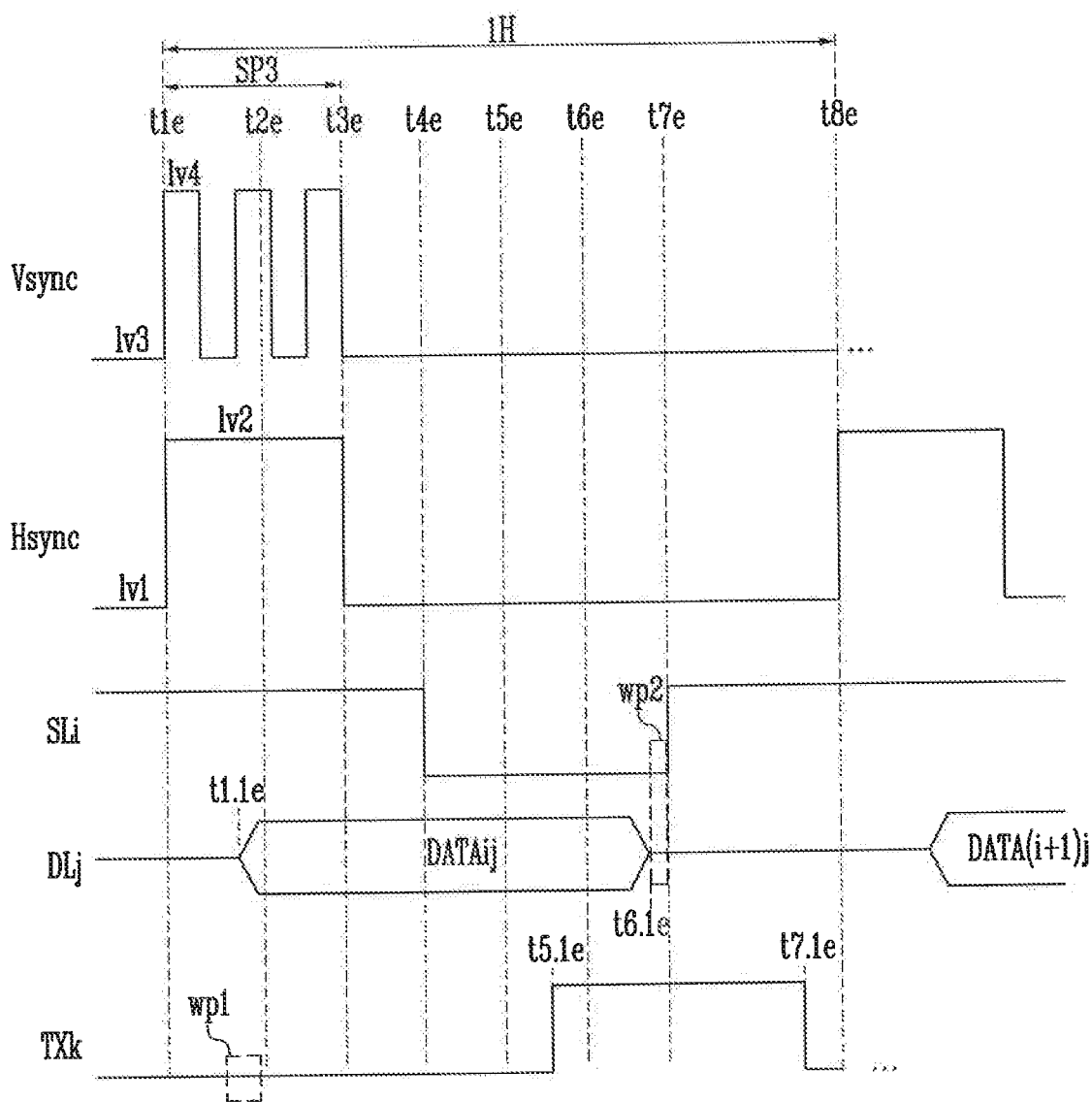
Figure 14:
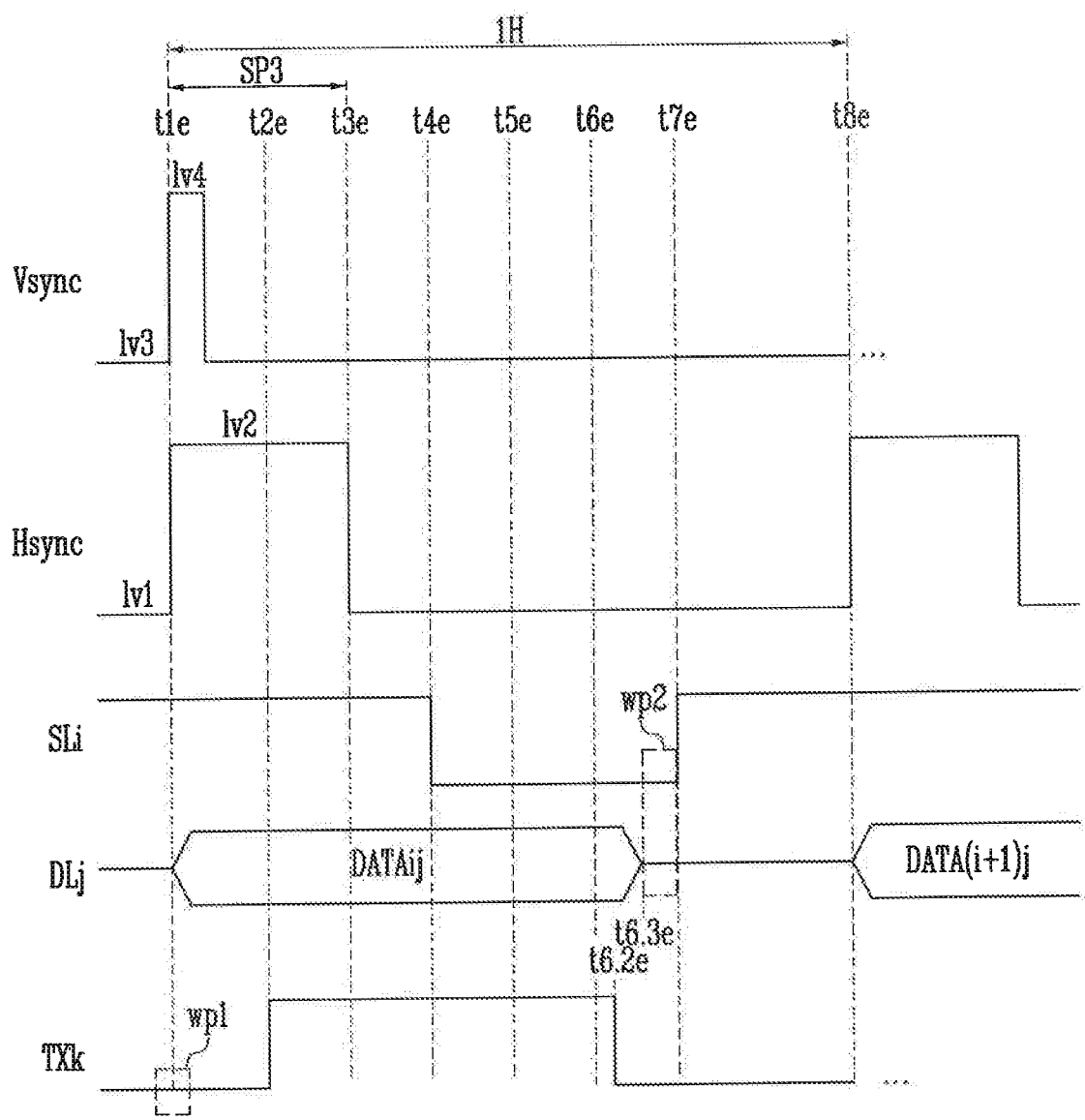

FIGS. 12 to 14 are diagrams illustrating horizontal periods in accordance with an embodiment of the present disclosure.

In FIGS. 12 to 14, signals of the ith scan line SLi and the jth data line DLJ, which are connected to the pixel PXij, are illustrated. In addition, a signal of a kth first sensor TXk is illustrated. A horizontal period 1H shown in FIGS. 12 to 14 may include a data write period (e.g., a data voltage storage period) of pixels (of an ith pixel row) connected to the ith scan line SLi.

As described above, the processor 9 may provide the vertical synchronization signal Vsync and the horizontal synchronization signal Hsync to the timing controller 11 (or the display driver 210. The sensor driver 220 may receive the vertical synchronization signal Vsync and the horizontal synchronization signal Hsync. The sensor driver 220 may directly receive the vertical synchronization signal Vsync and the horizontal synchronization signal Hsync from the processor 9, or receive vertical synchronization signal Vsync and the horizontal synchronization signal Hsync from the timing controller 11 (or the display driver 210).

The horizontal period 1H may be from a time t1e at which the horizontal synchronization signal Hsync is changed from the first logic level Iv1 to the second logic level Iv2 to a next time t8e at which the horizontal synchronization signal Hsync is changed from the first logic level Iv1 to the second logic level Iv2.

In the horizontal period 1H, the vertical synchronization signal Vsync may be changed at least once from the third logic level Iv3 to the fourth logic level Iv4, while the horizontal synchronization signal Hsync is maintained at the second logic level Iv2. For example, in FIG. 12, the vertical synchronization signal Vsync may change to the fourth logic level Iv4 twice. In the horizontal period 1H, a period in which the vertical synchronization signal Vsync is maintained at the fourth logic level Iv4 may be shorter than the third period SP3 in which the horizontal synchronization signal Hsync is maintained at the second logic level Iv2. In the horizontal period 1H, the vertical synchronization signal Vsync may be maintained at the third logic level Iv3, while the horizontal synchronization signal Hsync is maintained at the first logic level Iv1. In other words, the third logic level Iv3 of the vertical synchronization signal Vsync may overlap the first logic level Iv1 of the horizontal synchronization signal Hsync.

Referring to FIG. 12, a case where the display device 1 is driven in a first mode is illustrated. For example, during the third period 5P3 in the first mode, the number of times the logic level of the vertical synchronization signal Vsync is changed may be four times (e.g., the rising transition occurs twice and the falling transition occurs twice). The display driver 210 and the sensor driver 220 are in a state in which the display driver 210 and the sensor driver 220 receive the vertical synchronization signal Vsync and the horizontal synchronization signal Hsync, and therefore, it can be seen that the mode of a current horizontal period 1H is the first mode.

In the first mode, the data driver 12 (or the display driver 210) may start outputting data voltages DATAij, . . . to at least some (e.g., an ith pixel row) of the pixels PX at a first time t1e during the horizontal period 1H, and end outputting the data voltages DATAij, . . . at a second time t6e during the horizontal period 1H. For example, the data driver 12 may output the data voltage DATAij to the jth data line DLj during a period t1e to t6e.

In the first mode, the sensor driver 220 (or the sensor transmitter TDC) may change the logic level of a sensing signal of at least a portion TXk of the sensors at a third time t2e different from the first time t1e and the second time t6e during the horizontal period 1H. For example, the sensor driver 220 may supply a rising transition signal to the kth first sensor TXk at the third time t2e. One or more third times may exist in one horizontal period 1H. For example, the sensor driver 220 may supply a falling transition signal to the kth first sensor TXk at a third time t5e.

The first time t1e at which the data voltage DATAij fluctuates may correspond to a sensor weak period wp1. As described above, an unintended parasitic capacitance may exist between the sensor TXk and the pixel PXij, and the fluctuation of the data voltage DATAij at the first time t1e may act as sensing noise on the sensor unit 120. Therefore, the sensor driver 220 may perform sensing while avoiding the sensor weak period wp1. In other words, the sensor driver 220 may not perform sensing in the sensor weak period wp1.

In addition, a period t6e to t7e in which the scan transistor T2 is turned on in a state in which the data line DLj is floated as the supply of the data voltage DATAij is ended may correspond to a display weak period wp2. When the transition of a sensing signal is made in the display weak period wp2, an erroneous data voltage may be written to the pixel PXij. Therefore, the sensor driver 220 may perform sensing while avoiding the display weak period wp2. In other words, the sensor driver 220 may not perform sensing in the display weak period wp2.

In accordance with an embodiment of the present disclosure, from a fourth time t4e to a fifth time t7e during the horizontal period 1H, the scan driver 13 may output the scan signal having the turn-on level to at least a portion PXij of the pixels. From the second time t6e to the fifth time t7e, the logic level (logic low level) of the sensing signal may be maintained. In other words, the logic low level of the sensing signal may be maintained in the display weak period wp2.

Referring to FIG. 13, a case where the display device 1 is driven in a second mode is illustrated. For example, during the third period SP3 in the second mode, the number of times the logic level of the vertical synchronization signal Vsync is changed may be six times (e.g., the rising transition occurs three times and the falling transition occurs three times). The display driver 210 and the sensor driver 220 are in a state in which the display driver 210 and the sensor driver 220 receive the vertical synchronization signal Vsync and the horizontal synchronization signal Hsync, and therefore, it can be seen that the mode of a current horizontal period 1H is the second mode.

In the second mode, the data driver 12 (or the display driver 210) may start outputting data voltages DATAij, . . . to at least some (e.g., an ith pixel row) of the pixels PX at a first time t1.1e during the horizontal period 1H, and end outputting the data voltages DATAij, . . . at a second time t6.1e during the horizontal period 1H. For example, the data driver 12 may output the data voltage DATAij to the jth data line DLj during a period t1.1e to t6.1e.

In the second mode, the sensor driver 220 (or the sensor transmitter TDC) may change the logic level of a sensing signal of at least a portion TXk of the sensors at a third time t5.1e different from the first time t1.1e and the second time t6.1e during the horizontal period 1H. For example, the sensor driver 220 may supply a rising transition signal to the kth first sensor TXk at the third time t5.1e. The third time t5.1e is prior to the second time t6.1e. One or more third times may exist in one horizontal period 1H. For example, the sensor driver 220 may supply a falling transition signal to the kth first sensor TXk at a third time t7.1e. This third time, i.e., t7.1e occurs after the second time t6.1e.

In accordance with an embodiment of the present disclosure, from a fourth time t4e to a fifth time t7e during the horizontal period 1H, the scan driver 13 may output the scan signal having the turn-on level to at least a portion PXij of the pixels. From the second time t6.1e to the fifth time t7e, the logic level (logic low level) of the sensing signal may be maintained. In other words, the logic low level of the sensing signal may be maintained in the display weak period wp2 of FIG. 13.

Referring to FIGS. 12 and 13, a period t1e to t6e in which data voltages are output when the number of times the logic level of the vertical synchronization signal |Vsync|$_{[RDR1]}$ is changed is n times (e.g., four times) and a period t1.1e to t6.1e in which data voltages are output when the number of times the logic level vertical synchronization signal |Vsync|$_{[RDR2]}$ is changed is m times (e.g., six times) may have the same length and have different phases with respect to the horizontal period 1H. The n and the m are different positive integers. Therefore, in the first mode shown in FIG. 12 and the second mode shown in FIG. 13, the sensor weak period wp1 and the display weak period wp2 may be different from each other. For example, the sensor weak period wp1 in FIG. 13 occurs later than the sensor weak period wp1 in FIG. 12 and the display weak period wp2 of FIG. 13 is shorter than the display weak period wp2 of FIG. 12.

In accordance with an embodiment of the present disclosure, a period t2e to t5e in which the level of a sensing signal is maintained when the number of times the logic level of the vertical synchronization signal |Vsync|$_{[RDR3]}$ is changed is n times and a period t5.1e to t7.1e in which the level of a sensing signal is maintained when the number of times the logic level of the vertical synchronization signal |Vsync|$_{[RDR4]}$ is changed is m times may have the same length and have different phases with respect to the horizontal period 1H.

In accordance with this embodiment, at least one of the first time, the second time, and the third time may be changed according to the number of times the logic level of the vertical synchronization signal Vsync is changed while the horizontal synchronization signal Hsync is maintained at a specific logic level (e.g., the second logic level Iv2). Thus, the supply of the data voltage DATAij and the sensing signal is possible, corresponding to the sensor weak period wp1 and the display weak period wp2, which are changed according to the mode.

Referring to FIG. 14, a case where the display device 1 is driven in a third mode is illustrated. For example, during the third period SP3 in the third mode, the number of times the logic level of the vertical synchronization signal Vsync is changed may be twice (e.g., the rising transition occurs once and the falling transition occurs once). The display driver 210 and the sensor driver 220 are in a state in which the display driver 210 and the sensor driver 220 receive the vertical synchronization signal Vsync and the horizontal synchronization signal Hsync, and therefore, it can be seen that the mode of a current horizontal period 1H is the third mode.

In the third mode, the data driver 12 (or the display driver 210) may start outputting data voltages DATAij, . . . to at least some (e.g., an ith pixel row) of the pixels PX at a first time t1e during the horizontal period 1H, and end outputting the data voltages DATAij, at a second time t6.3e during the horizontal period 1H. For example, the data driver 12 may output the data voltage DATAij to the jth data line DLj during a period t1e to t6.3e.

In the third mode, the sensor driver 220 (or the sensor transmitter TDC) may change the logic level of a sensing signal of at least a portion TXk of the sensors at a third time t2e different from the first time t1e and the second time t6.3e during the horizontal period 1H. For example, the sensor driver 220 may supply a rising transition signal to the kth first sensor TXk at the third time t2e. One or more third times may exist in one horizontal period 1H. For example, the sensor driver 220 may supply a falling transition signal to the kth first sensor TXk at a third time t6.2e. Here, the third time t6.2e may occur prior to the second time t6.3e.

In accordance with an embodiment of the present disclosure, from a fourth time t4e to a fifth time t7e during the horizontal period 1H, the scan driver 13 may output the scan signal having the turn-on level to at least a portion PXij of the pixels. From the second time t6.3e to the fifth time t7e, the logic level (logic low level) of the sensing signal may be maintained. In other words, the logic lac level of the sensing signal may be maintained during the display weak period wp2 of FIG. 14.

Referring to FIGS. 12 and 14, a period t1e to t6e in which data voltages are output when the number of times the logic level is changed is n times (e.g., four times in FIG. 12) and a period t1e to t6.3e in which data voltages are output when the number of times the logic level is changed is m times (e.g., twice in FIG. 14) may have different lengths with respect to the horizontal period 1H. The n and the m are different positive integers. For example, the first mode shown in FIG. 12 may be advantageous in displaying an image of a single color pattern, and the third mode shown in FIG. 14 may be advantageous in displaying an image of a stripe pattern. In the first mode shown in FIG. 12 and the third mode shown in FIG. 14, the sensor weak period wp1 and the display weak period wp2 may be different from each other. For example, the display weak period wp2 in FIG. 14 may be shorter than that in FIG. 12.

In accordance with an embodiment of the present disclosure, a period t2e to t5e in which the level of a sensing signal is maintained when the number of times the logic level is changed is n and a period t2e to t6.2e in which the level of a sensing signal is maintained when the number of times the logic level is changed is m may have different lengths with respect to the horizontal period 1H.

In accordance with this embodiment, at least one of the first time, the second time, and the third time may be changed according to the number of times the logic level of the vertical synchronization signal Vsync is changed while the horizontal synchronization signal Hsync is maintained at a specific logic level (e.g., the second logic level Iv2). Thus, the supply of the data voltage DATAij and the sensing signal is possible, corresponding to the sensor weak period wp1 and the display weak period wp2, which are changed according to the mode.

In accordance with the above-described embodiments, there can be provided a display device and a driving method thereof, which can change timings of sensing signals and display signals while minimizing interference, using the existing control signals Vsync and Hsync.

An embodiment of the present disclosure provides a display device 1 including: pixels PX; a data driver 12 configured to start outputting data voltages DATAij to at least some of the pixels at a first time (e.g., t1e in FIG. 12) during a horizontal period 1H, and end outputting the data voltages DATAij at a second time (e.g., t6e in FIG. 12) during the horizontal period 1H; sensors SC; and a sensor driver 220 configured to change a logic level of a sensing signal of at least some of the sensors TXk at a third time (e.g., t2e in FIG. 12) different from the first time t1e and the second time t6e during the horizontal period 1H, wherein at least one of the first time t1e, the second time the, and the third time t2e is changed according to a number of times a logic level of a vertical synchronization signal Vsync is changed while a logic level of a horizontal synchronization signal Hsync is |maintained|$_{[RDR5]}$.

Figure 15:
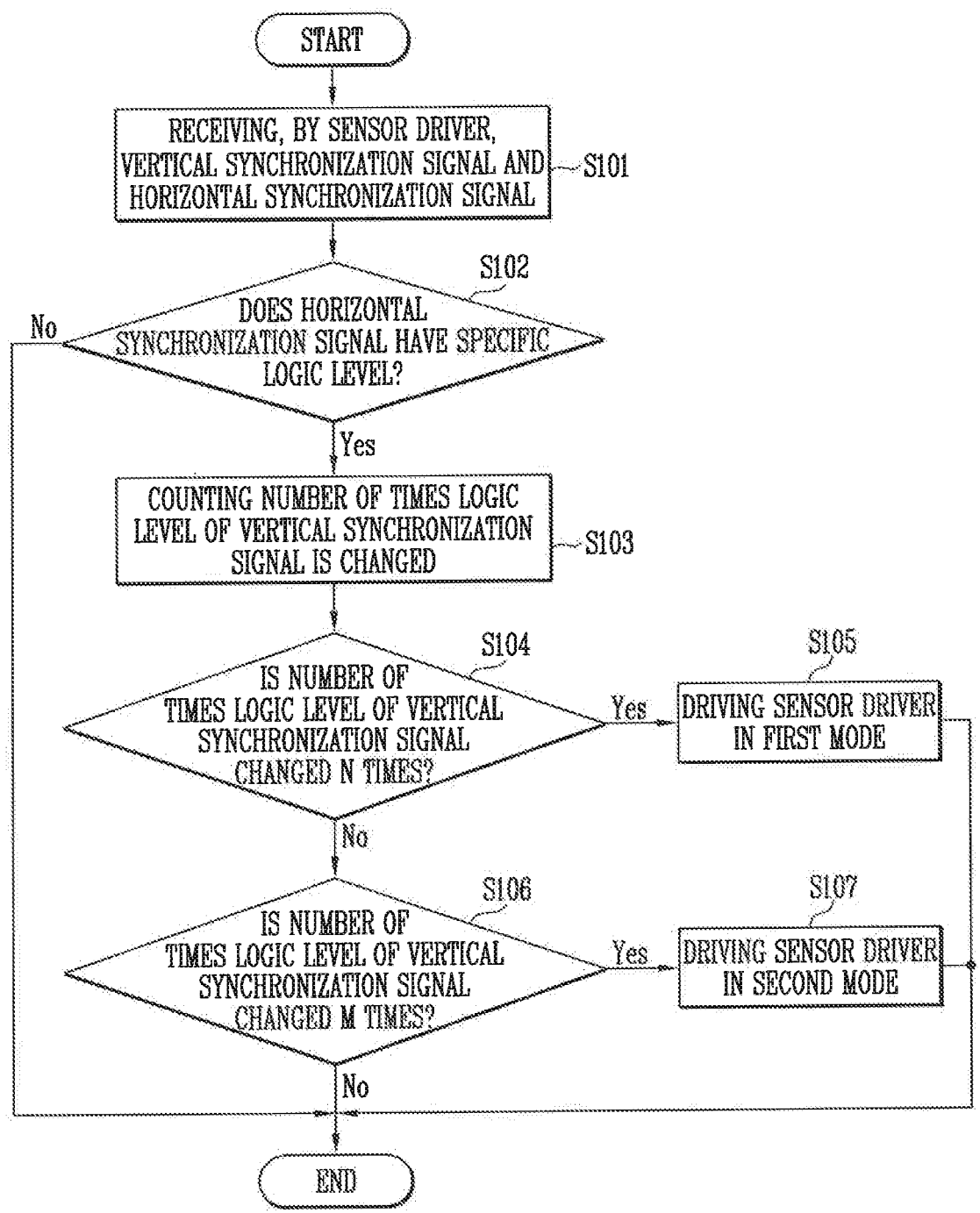
FIG. 15 is a diagram illustrating a driving method of the display device in accordance with an embodiment of the present disclosure.

FIG. 15 is a diagram illustrating a driving method of the display device in accordance with an embodiment of the present disclosure.

In FIG. 15, descriptions of portions overlapping with those shown in FIGS. 12 to 14 will be omitted.

First, the sensor driver 220 may receive the vertical synchronization signal Vsync and the horizontal synchronization signal Hsync (S101). Next, when the horizontal synchronization signal Hsync has a specific logic level (e.g., the second logic level Iv2) (S102), the sensor driver 220 may count a number of times the logic level of the vertical synchronization signal Vsync is changed (S103).

When the number of times the logic level of the vertical synchronization signal Vsync is changed is n times (S104), the sensor driver 220 may be driven in a first mode (S105). When the number of times the logic level of the vertical synchronization signal Vsync is changed is m times (S106), the sensor driver 220 may be driven in a second mode (S107).

Figure 16:
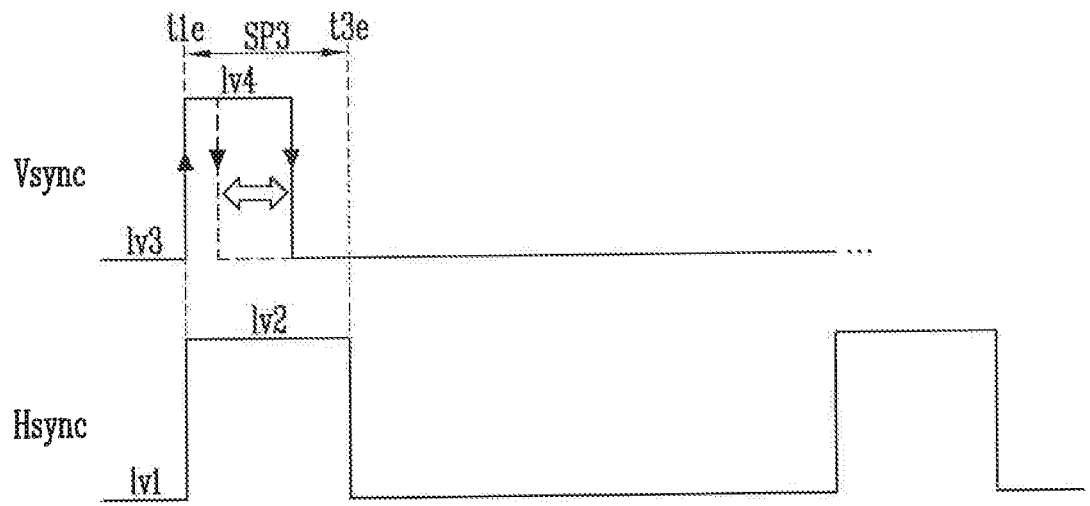
FIGS. 16 and 17 are diagrams illustrating horizontal periods in accordance with another embodiment of the present disclosure.
Figure 17:
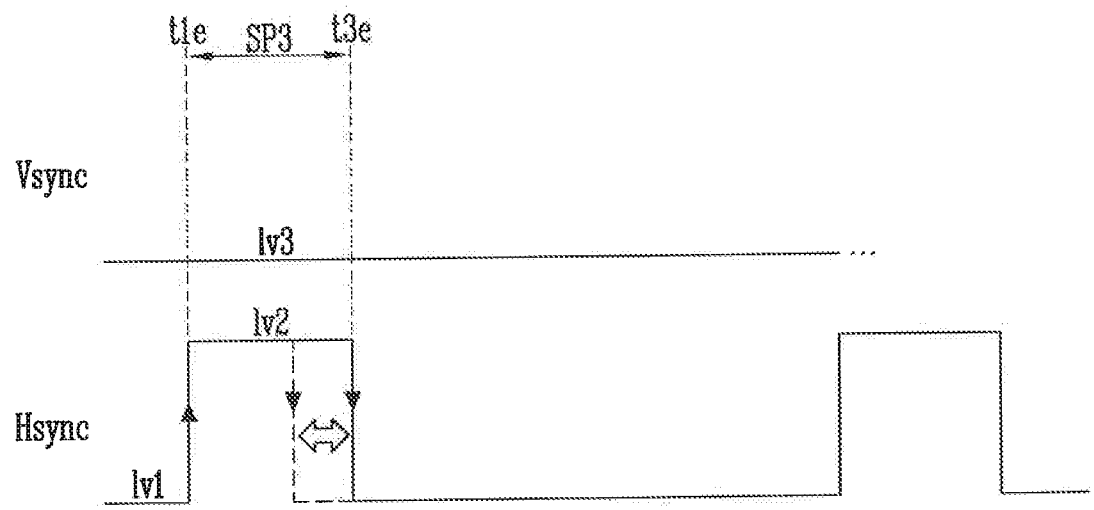

FIGS. 16 and 17 are diagrams illustrating horizontal periods in accordance with another embodiment of the present disclosure.

Referring to FIG. 16, an example in which mode information is provided by using a duty ratio of the vertical synchronization signal Vsync during the third period SP3 is illustrated. While mode information is provided to the sensor driver 220 by using the number of times the logic level of the vertical synchronization Vsync signal is changed in the embodiments shown in FIGS. 12 to 15, mode information may be provided to the sensor driver 220 by using the duty ratio of the vertical synchronization signal Vsync in the embodiment shown in FIG. 16. The duty ratio of the vertical synchronization signal Vsync is a ratio between a period in which the vertical synchronization signal Vsync is maintained at the third logic level Iv3 and a period in which the vertical synchronization signal Vsync is maintained at the fourth logic level Iv4 during the third period SP3. In the embodiment shown in FIG. 16, numbers of times (e.g., twice) the logic level of the vertical synchronization signal Vsync is changed in third periods SP3 of the respective modes may be the same.

Referring to FIG. 17, an example in which mode information is provided by using a duty ratio of the horizontal synchronization signal Hsync during the third period SP3 is illustrated. While mode information is provided to the sensor driver 220 by using the number of times the logic level of the vertical synchronization Vsync signal is changed in the embodiments shown in FIGS. 12 to 15, mode information may be provided to the sensor driver 220 by using the duty ratio of the horizontal synchronization signal Hsync in the embodiment shown in FIG. 17. The duty ratio of the horizontal synchronization signal Hsync is a ratio between a period in which the horizontal synchronization signal Hsync is maintained at the first logic level Iv1 and a period in which the horizontal synchronization signal Hsync is maintained at the second logic level Iv2 during the third period SP3. In the embodiment shown in FIG. 17, logic levels of the vertical synchronization signal Vsync in third periods SP3 of the respective modes may be maintained as the third logic level Iv3.

FIGS. 18 to 24 are views illustrating an example configuration of a display device. Reference numerals shown in FIGS. 18 to 24 and reference numerals shown in FIGS. 1 to 17 are independent from each other.

Figure 18:
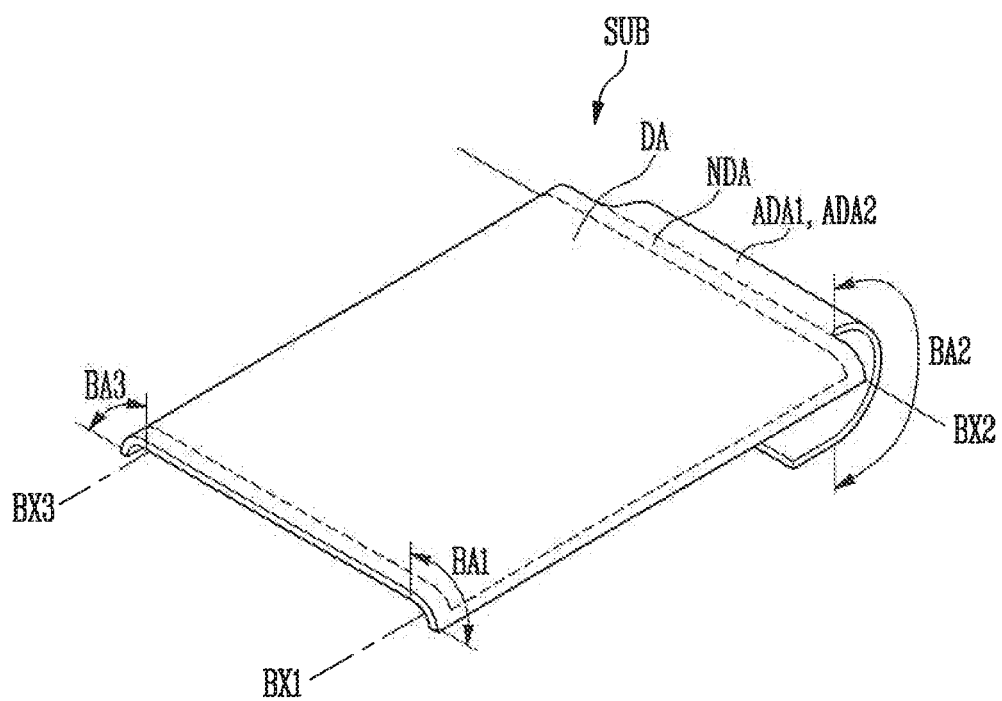
FIGS. 18, 19, 20, 21, 22, 23 and 24 are views illustrating an example configuration of a display device.
Figure 19:
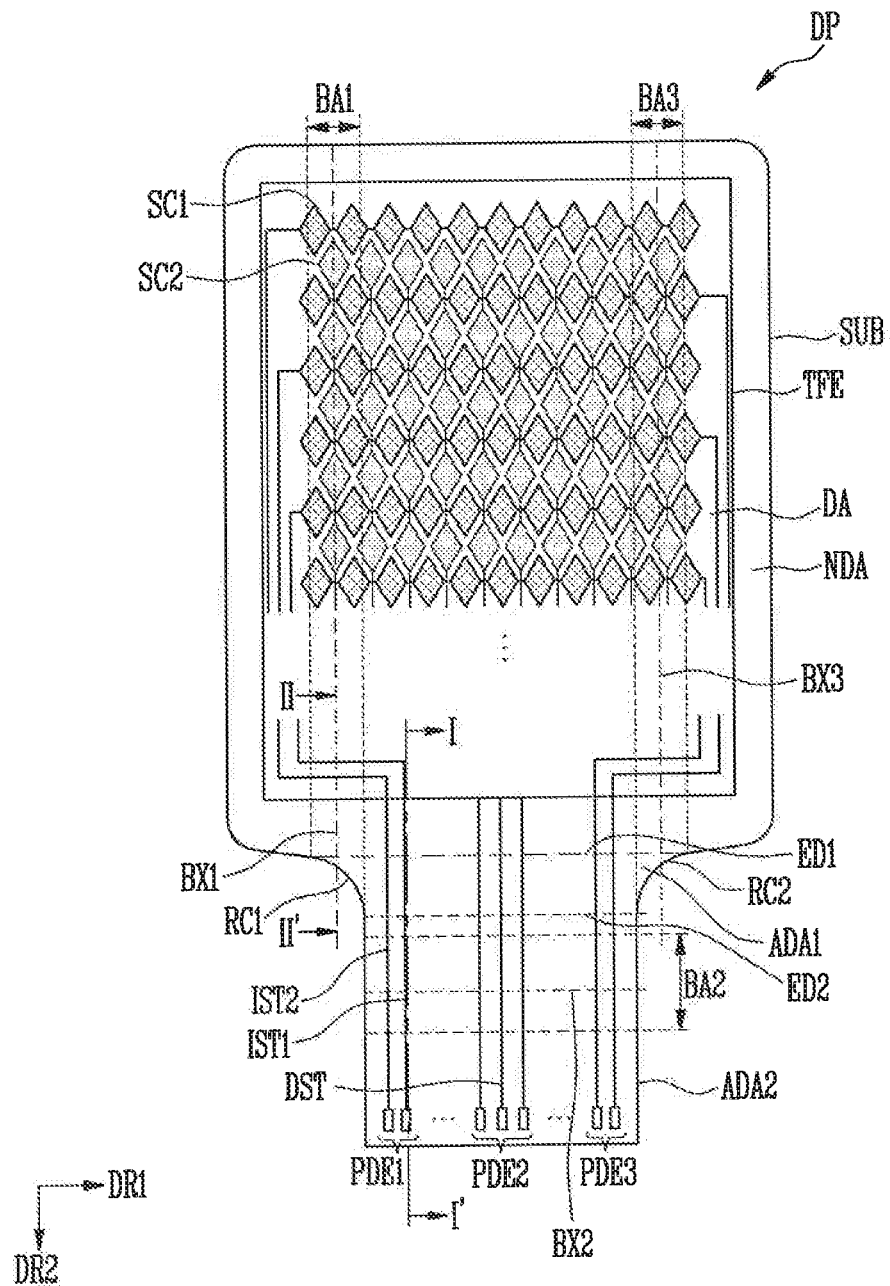

FIG. 18 is a view illustrating a substrate in accordance with an embodiment of the present disclosure, and FIG. 19 is a view illustrating a display device in accordance with an embodiment of the present disclosure.

In the following embodiments, a plane may define a position in a first direction DR1 and a second direction DR2, and a height may define a position in a third direction DR3 (see FIG. 20). The first direction DR1, the second direction DR2, and the third direction DR3 may be directions orthogonal to each other.

The substrate SUB may include a display area DA, a non-display area NDA, a first additional area ADA1, and a second additional area ADA2.

The display area DA may have a rectangular shape. Each corner of the display area DA may have an angular shape or a curved shape. In addition, in the case of a circular display, the display area DA may have a circular shape. Further, the display area DA may be configured in a polygonal shape, an elliptical shape, or the like, instead of a quadrangular shape. As described above, the shape of the display area DA may be differently set according to products.

Pixels may be located on the display area DA. Each pixel may include a light emitting diode or include a liquid crystal layer according to the kind of the display device DP.

The non-display area NDA may surround the periphery of the display area DA. For example, the display area NDA may have a rectangular shape. Each corner of the non-display area NDA may have an angular shape or a curved shape. A case where each corner of the non-display area NDA has a curved shape is illustrated in FIG. 19. The non-display area NDA may have a circular shape. That the non-display area NDA is minimized to form a narrow bezel structure, and therefore, the shape of the non-display area NDA may be similar to that of the display area DA.

The first additional area ADA1 may be located between the non-display area NDA and the second additional area ADA2. The first additional area ADA1 may be connected to the non-display area NDA at a first boundary ED1. The first additional area ADA1 may be connected to the second additional area ADA2 at a second boundary ED2. Each of the first boundary ED1 and the second boundary ED2 may extend in the first direction DR1.

A width of the first additional area ADA1 may become narrower when approaching the second boundary ED2 from the first boundary ED1. In other words, a width of the first additional area ADA1 in the first direction DR1 may become narrower along the second direction DR2. For example, the width of the first additional area ADA1 may be greater adjacent to the first boundary ED1 in comparison to the width of the first additional area ADA1 adjacent to the second boundary ED2. Accordingly, the first additional area ADA1 may include a curved first side surface RC1 and a curved second side surface RC2. The first and second side surfaces RC1 and RC2 may be convex toward the inside of the substrate SUB (e.g., the center of the substrate SUB).

In FIG. 19, the first additional area ADA1 is illustrated to include the first and second side surfaces RC1 and RC2 in the first direction DR1 and the opposite direction thereof. In another embodiment of the present disclosure, the first additional area ADA1 may include only the first side surface RC1 as a boundary of the first additional area ADA1, which is located in the first direction DR1. Here, the first side surface RC1 is part of the non-display area NDA. In still another embodiment of the present disclosure, the first additional area ADA1 may include only the second side surface RC2 as a boundary of the first additional area ADA1, which is located in the opposite direction of the first direction DR1. Here, the second side surface RCS is part of the non-display area NDA.

The second additional area ADA2 may have a rectangular shape. Each corner of the second additional area ADA2, which is located in the second direction DR2, may have an angular shape or a curved shape. A case where each corner of the second additional area ADA2, which is located in the second direction DR2, has an angular shape is illustrated in FIG. 19.

An encapsulation layer TFE may be located over the pixels. For example, the encapsulation layer TFE may cover the pixels in the display area DA, and a boundary of the encapsulation layer TFE may be located in the non-display area NDA. The encapsulation layer TFE covers light emitting elements and pixel circuit elements of the pixels in the display area DA, to prevent damage from external moisture or impact.

Sensing electrodes SC1 and SC2 may be located on the encapsulation layer TFE. The sensing electrodes SC1 and SC2 may sense a touch input by a body of a user, an object hovering, a gesture, an object's proximity, etc. The sensing electrodes SC1 and SC2 may be configured in another shape according to various types including a resistive type, a capacitive type, an electro-magnetic (EM) type, an optical type, and the like. For example, when the sensing electrodes SC1 and SC2 are configured using the capacitive type, the sensing electrodes SC1 and SC2 may be configured using a self-capacitive type, a mutual capacitive type, or the like. Hereinafter, for convenience of description, a case where the sensing electrodes SC1 and SC2 are configured using the mutual capacitive type will be described as an example.

When the sensing electrodes SC1 and SC2 are configured using the mutual capacitive type, a driving signal may be transmitted through a sensing line corresponding to a first sensing electrode SC1, and a sensing signal may be received through a sensing line corresponding to a second sensing electrode SC2 which forms a mutual capacitance together with the first sensing electrode SC1. When a body of a user comes close the sensing electrodes SC1 and SC2, the mutual capacitance between the first sensing electrode SC1 and the second sensing electrode SC2 may be changed, and a touch of the user may be detected according to a difference in the sensing signal, which is caused by the change in the mutual capacitance. In another embodiment of the present disclosure, a driving signal may be transmitted through the sensing line corresponding to the second sensing electrode SC2, and a sensing signal may be received through the sensing line corresponding to the first sensing electrode SC1 which forms the mutual capacitance together with the second sensing electrode SC2.

Pads PDE1, PDE2, and PDE3 may be located on the second additional area ADA2. Pads PDE1 and PDE3 may be connected to the sensing electrodes SC1 and SC2 located on the encapsulation layer TFE through sensing lines IST1 and IST2. The pads PDE1 and PDE3 may be connected to an external touch integrated circuit (IC). In addition, pads PDE2 may be connected to the pixels or a driver of the pixels, located on the bottom of the encapsulation layer TFE, through display lines DST. The driver of the pixels may include a scan driver, an emission driver, a data driver, and the like. The driver may be located on the bottom of the encapsulation layer TFE, and be located in an external display IC connected through the pads PDE2.

When the display device DP is of the mutual capacitive type, the touch IC may transmit a driving signal through a first sensing line IST1, and receive a sensing signal through a second sensing line IST2. In another embodiment of the present disclosure, the touch IC may transmit a driving signal through the second sensing line IST2, and receive a sensing signal through the first sensing line IST1. When the display device DP is of the self-capacitive type, there may be no difference in driving method between the first sensing line IST1 and the second sensing line IST2. The display lines DST may include a control line, a data line, a power line, and the like, and provide signals such that the pixels can display an image. The signals may be provided from the driver connected to the display lines DL.

FIG. 18 illustrates a state in which the substrate SUB is bent, and FIG. 19 illustrates a state in which the substrate SUB is not bent. The display device DP may be bent as shown in FIG. 18, after elements are stacked on the substrate SUB in a state in which the display device DP is not bent as shown in FIG. 19.

The substrate SUB may include a first bending area BA1 extending from the first side surface RC1 of the first additional area ADA1 to overlap the non-display area NDA. Additionally, the first bending area BA1 may overlap the display area DA. In other words, each of the display area DA, the non-display area NDA, and the first additional area ADA1 may partially overlap the first bending area BA1. The first bending area BA1 may have a width in the first direction DR1, and have a length extending in the second direction DR2. A first bending axis BX1 may be a folding line extending in the second direction DR2 at the center of the first bending area BA1. In some embodiments of the present disclosure, the first bending area BA1 may be a portion at which stress is reduced as a partial insulating layer or the like is removed unlike another portion at the periphery thereof. In some embodiments of the present disclosure, the first bending area BA1 may have the same configuration as another portion at the periphery thereof.

The substrate SUB may include a third bending area BA3 extending from the second side surface RC2 of the first additional area ADA1 to overlap the non-display area NDA. Additionally, the third bending area BA3 may overlap with the display area DA. In other words, each of the display area DA, the non-display area NDA, and the first additional area ADA1 may partially overlap the third bending area BA3. The third bending area BA3 may have a width in the first direction DR1, and have a length extending in the second direction DR2. A third bending axis BX3 may be a folding line extending in the second direction DR2 at the center of the third bending area BA3. In some embodiments of the present disclosure, the third bending area BA3 may be a portion at which stress is reduced as a partial insulating layer or the like is removed unlike another portion at the periphery thereof. In some embodiments of the present disclosure, the third bending area BA3 may have the same configuration as another portion at the periphery thereof.

The second additional area ADA2 may include a second bending area BA2. The second bending area BA2 may have a width in the second direction DR2, and have a length extending in the first direction DR1. A second bending axis BX2 may be a folding line extending in the first direction DR1 at the center of the second bending area BA2. In some embodiments of the present disclosure, the second bending area BA2 may be a portion at which stress is reduced as a partial insulating layer or the like is removed unlike another portion at the periphery thereof. In some embodiments of the present disclosure, the second bending area BA2 may have the same configuration as another portion at the periphery thereof.

The first to third bending areas BA1, BA2, and BA3 may not overlap each other.

The term "folded" may not mean a fixed shape but may inclusively mean a shape deformable into another shape from the original shape. The term "folded" may include a shape folded, curved, or rolled like a roll along at least one bending axis. By the first and third bending areas BA1 and BA3, side bezel widths of the display device DP in the first direction DR1 and the opposite direction of the first direction DR1 may be decreased. In addition, by the second bending area BA2, a side bezel width of the display device DP in the second direction DR2 may be decreased.

Figure 20:
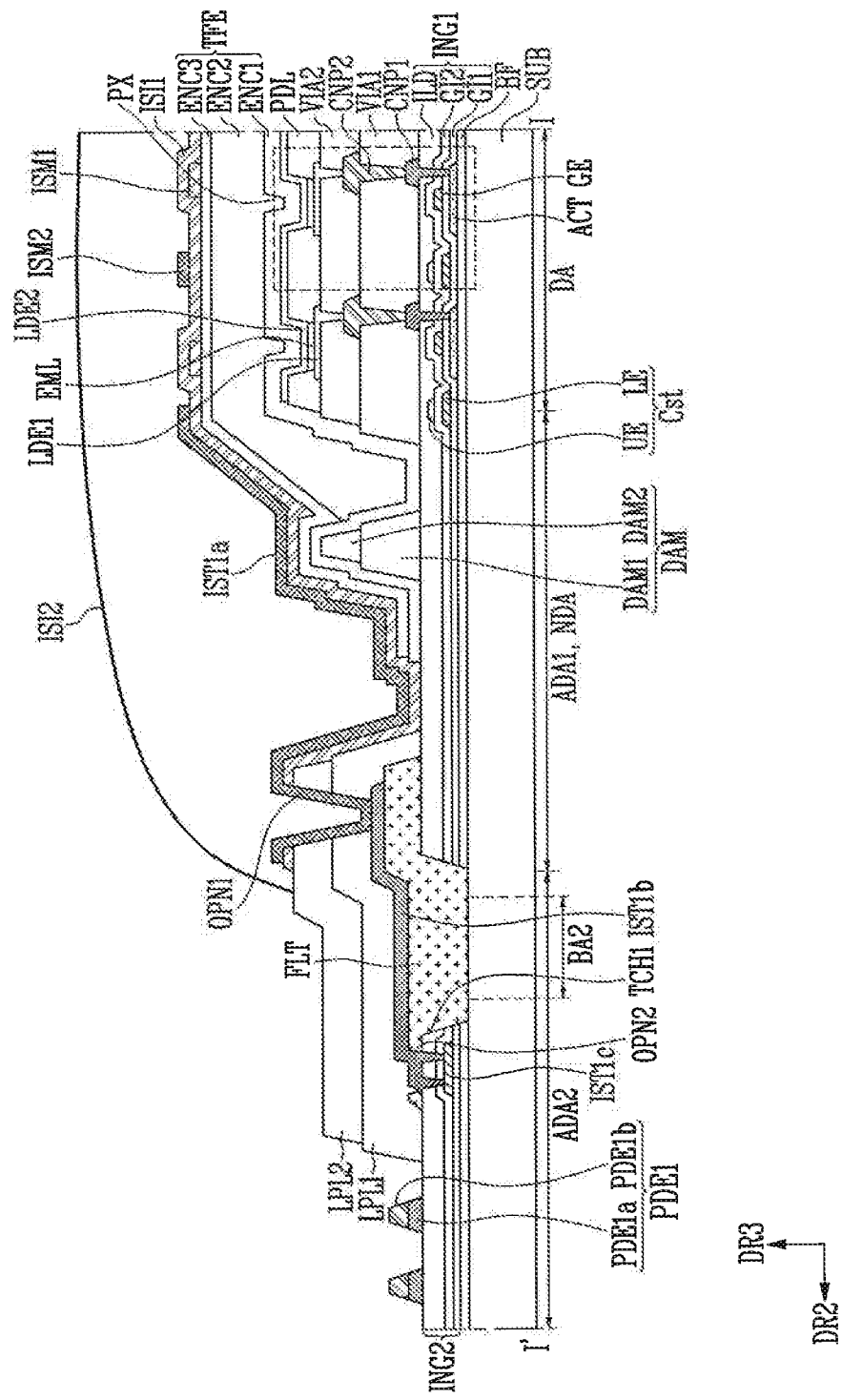

FIG. 20 illustrates an embodiment of a section corresponding to line I-I' shown in FIG. 19. It is shown that the line I-I' shown in FIG. 19 passes through the first pad PDE1 and the first sensing line IST1.

First, the display area DA will be described. In an embodiment of the present disclosure, pixels PX are provided in the display area DA. Each pixel PX may include a transistor connected to a corresponding line among the display lines DST, a light emitting element connected to the transistor, and a capacitor Cst. In FIG. 20, for convenience of description, one transistor, one light emitting element, and one capacitor Cst are illustrated with respect to one pixel PX.

The substrate SUB may be made of an insulative material such as glass or resin. In addition, the substrate SUB may be made of a material having flexibility to be bendable or foldable, and have a single- or multi-layered structure.

For example, the substrate SUB may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material constituting the substrate SUB may be variously changed, and the substrate SUB may be made of a Fiber Reinforced Plastic (FRP), etc.

For example, when the substrate SUB has a multi-layered structure, inorganic materials such as silicon nitride, silicon oxide, and silicon oxynitride may be interposed as a single layer or a multi-layer between a plurality of layers.

A buffer layer BF may cover the substrate SUB. The buffer layer BF may prevent an impurity from being diffused into a channel of the transistor. The buffer layer BF may be an inorganic insulating layer made of an inorganic material. For example, the buffer layer BF may be formed of silicon nitride, silicon oxide, silicon oxynitride, etc. The buffer layer BF may be omitted according to the material and process conditions of the substrate SUB. In some embodiments of the present disclosure, a barrier layer may be further provided.

An active layer ACT may be located on the buffer layer BF. The active layer ACT may be patterned to constitute the channel, a source electrode, and a drain electrode of the transistor or to constitute a line. The active layer ACT may be formed of a semiconductor material. The active layer ACT may be a semiconductor pattern made of poly-silicon, amorphous silicon, an oxide semiconductor, etc. The channel of the transistor is a semiconductor pattern undoped with an impurity, and may be an intrinsic semiconductor. The source electrode, the drain electrode, and the line may correspond to a semiconductor pattern doped with the impurity. The impurity may include impurities such as an n-type impurity, a p-type impurity, and other metals.

A first gate insulating layer GI1 may cover the active layer ACT. The first gate insulating layer Gil may be an inorganic insulating layer made of an inorganic material. The inorganic material may include inorganic insulating materials such as polysiloxane, silicon nitride, silicon oxide, and silicon oxynitride.

A gate electrode GE of the transistor and a lower electrode LE of the capacitor Cst may be located on the first gate insulating layer GI1. The gate electrode GE may overlap an area corresponding to the channel.

The gate electrode GE and the lower electrode LE may be made of a metal. For example, the gate electrode GE may be made of at least one of metals such as gold (Au), silver (Ag), aluminum (Al), molybdenum (Mo), chromium (Cr), titanium (Ti), nickel (Ni), neodymium (Nd), and copper (Cu), or any alloy thereof. In addition, the gate electrode GE may be formed as a single layer. However, the present disclosure is not limited thereto, and the gate electrode GE may be formed as a multi-layer in which two or more material among metals and alloys are stacked.

A second gate insulating layer GI2 may cover the gate electrode GE and the lower electrode LE. The second gate insulating layer GI2 may be an inorganic insulating layer made of an inorganic material. The inorganic material may include polysiloxane, silicon nitride, silicon oxide, silicon oxynitride, etc.

An upper electrode UE of the capacitor Cst may be located on the second gate insulating layer GI2. The upper electrode UE of the capacitor Cst may be made of a metal. For example, the upper electrode UE may be made of at least one of metals such as gold (Au), silver (Ag), aluminum (Al), molybdenum (Mo), chromium (Cr), titanium (Ti), nickel (Ni), neodymium (Nd), and copper (Cu), or any alloy thereof. In addition, the upper electrode UE may be formed as a single layer. However, the present disclosure is not limited thereto, and the upper electrode UE may be formed as a multi-layer in which two or more material among metals and alloys are stacked.

The lower electrode LE and the upper electrode UE may constitute the capacitor Cst with the second gate insulating layer GI2 interposed therebetween. In FIG. 20, a case where the capacitor Cst has a two-layer electrode structure of the lower electrode LE and the upper electrode UE has been illustrated. However, in another embodiment of the present disclosure, the capacitor Cst may be configured in a three-layer electrode structure by using the active layer ACT, in a three-layer electrode structure by using an electrode in the same layer as a first connection pattern CNP1, or in a four or more-layer electrode structure.

An interlayer insulating layer ILD may cover the upper electrode UE. The interlayer insulating layer ILD may be an inorganic insulating layer made of an inorganic material. The inorganic material may include polysiloxane, silicon nitride, silicon oxide, silicon oxynitride, etc.

In this embodiment, for convenience of description, the first gate insulating layer GI1, the second gate insulating layer GI2, and the interlayer insulating layer ILD may be designated as a first insulating layer group ING1. The first insulating layer group ING1 may cover a portion of the transistor. In some embodiments of the present disclosure, the first insulating layer group ING1 may further include the buffer layer BF.

The first connection pattern CNP1 may be located on the interlayer insulating layer ILD. The first connection pattern CNP1 may be in contact with each of the source electrode and the drain electrode of the active layer ACT through a contact hole formed in the interlayer insulating layer ILD, the second gate insulating layer GI2, and the first gate insulating layer GI1.

The first connection pattern CNP1 may be made of a metal. For example, the first connection pattern CNP1 may be made of at least one of metals such as gold (Au), silver (Ag), aluminum (Al), molybdenum (Mo), chromium (Cr), titanium (Ti), nickel (Ni), neodymium (Nd), and copper (Cu), or any alloy thereof.

In some embodiments of the present disclosure, a passivation layer may cover the first connection pattern CNP1.

The passivation layer may be an inorganic insulating layer made of an inorganic material. The inorganic material may include polysiloxane, silicon nitride, silicon oxide, silicon oxynitride, etc.

A first via layer VIA1 may cover the passivation layer or the transistor. The first via layer VIA1 may be an organic insulating layer made of an organic material. The organic material may include an organic insulating material such as a polyacryl-based compound, a polyimide-based compound, a fluorine-based compound such as Teflon, or a benzocyclobutene-based compound.

A second connection pattern CNP2 may be connected to the first connection pattern CNP1 through an opening of the first via layer VIA1. The second connection pattern CNP2 may be made of at least one of metals such as gold (Au), silver (Ag), aluminum (Al), molybdenum (Mo), chromium (Cr), titanium (Ti), nickel (Ni), neodymium (Nd), and copper (Cu), or any alloy thereof.

A second via layer VIA2 may cover the first via layer VIA1 and the second connection pattern CNP2. The second via layer VIA2 may be an organic insulating layer made of an organic material. The organic material may include an organic insulating material such as a polyacryl-based compound, a polyimide-based compound, a fluorine-based compound such as Teflon, or a benzocyclobutene-based compound.

A first light emitting element electrode LDE1 may be connected to the second connection pattern CNP2 through an opening of the second via layer VIA2. In FIG. 20, two of the first light emitting element electrodes LDE1 are connected to adjacent second connection patterns CNP2. In some embodiments of the present disclosure, the first light emitting element electrode LDE1 may be an anode of the light emitting element.

In some embodiments of the present disclosure, the configuration of the second via layer VIA2 and the second connection pattern CNP2 may be omitted, and the first light emitting element electrode LDE1 may be directly connected to the first connection electrode CNP1 through the opening of the first via layer VIA1.

The first light emitting element electrode LDE1 may be made of a metal layer such as Ag, Mg, Al, Pt, Pd, Au, Ni, Nd, Ir, Cr, or any alloy thereof, and/or a transparent conductive layer such as indium tin oxide (ITO), indium zinc oxide (IZO), zinc oxide (ZnO), or indium tin zinc oxide (ITZO). The first light emitting element electrode LDE1 may be made of a kind of metal. However, the present disclosure is not limited thereto, and the first light emitting element electrode LDE1 may be made of an alloy of two or more kinds of metals, e.g., Ag and Mg.

When an image is to be provided in a lower direction of the substrate SUB, the first light emitting element electrode LDE1 may be formed as a transparent conductive layer. When an image is to be provided in an upper direction of the substrate SUB, the first light emitting element electrode LDE1 may be formed as a metal reflective layer and/or a transparent conductive layer.

A pixel defining layer PDL defining an emission area of each pixel PX is provided on the substrate SUB on which the first light emitting element electrode LDE1 and the like are formed. The pixel defining layer PDL may be an organic insulating layer made of an organic material. The organic material may include an organic insulating material such as a polyacryl-based compound, a polyimide-based compound, a fluorine-based compound such as Teflon, or a benzocyclobutene-based compound.

The pixel defining layer PDL may expose a top surface of the first light emitting element electrode LDE1, and protrude from the substrate SUB along the circumference of the pixel PX. A light emitting layer EML may be provided in an area of the pixel PX surrounded by the pixel defining layer PDL. The light emitting layer EML may be in direct contact with the top surface of the first light emitting element electrode LDE1.

The light emitting layer EML may include a low molecular material or a high molecular material. The low molecular material may include copper phthalocyanine (CuPc), N,N'-Di(naphthalene-1-yl)-N,N'-diphenyl-benzidine (NPB), tris-8-hydroxyquinoline aluminum (Alq3) etc. These materials may be formed through vacuum deposition. The high molecular material may include PEDOT, a poly-phenylenevinylene-based (PPV)-based material, a polyfluorene-based material, etc.

The light emitting layer EML may be provided as a single layer, but may be provided as a multi-layer including various functional layers. When the light emitting layer EML is provided as the multi-layer, the light emitting layer EML may have a structure in which a hole injection layer, a hole transport layer, an emission layer, an electron transport layer, an electron injection layer, and the like are stacked in a single- or multi-layered structure. The light emitting layer EML may be formed through screen printing or inkjet printing, laser induced thermal imaging (LITI), etc.

In some embodiments of the present disclosure, at least a portion of the light emitting layer EML may be integrally formed throughout a plurality of first light emitting element electrodes LDE1, and be individually provided to correspond to each of the plurality of first light emitting element electrodes LDE1.

A second light emitting element electrode LDE2 may be provided on the light emitting layer EML. The second light emitting element electrode LDE2 may be provided for each pixel PX. However, the second light emitting element LDE2 may be provided to cover most of the display area DA, and be shared by a plurality of pixels PX. For example, the second light emitting element electrode LDE2 may extend from one pixel defining layer PDL to another pixel defining layer PDL.

In some embodiments of the present disclosure, the second light emitting element electrode LDE2 may be used as a cathode or an anode. When the first light emitting element electrode LDE1 is the anode, the second light emitting element electrode LDE2 may be used as the cathode. When the first light emitting element electrode LDE1 is the cathode, the second light emitting element electrode LDE2 may be used as the anode.

The second light emitting element electrode LDE2 may be made of a metal layer such as Ag, Mg, Al, Pt, Pd, Au, Ni, Nd, Ir, Cr, or any alloy thereof, and/or a transparent conductive layer such as indium tin oxide (ITO), indium zinc oxide (IZO), zinc oxide (ZnO), or indium tin zinc oxide (ITZO). In an embodiment of the present disclosure, the second light emitting element electrode LDE2 may be configured as a multi-layer having two or more layers including a metal thin film. For example, the second light emitting element electrode LDE2 may be configured as a triple layer of ITO/Ag/ITO.

When an image is to be provided in a lower direction of the substrate SUB, the second light emitting element electrode LDE2 may be formed as a metal reflective layer and/or a transparent conductive layer. When an image is to be provided in an upper direction of the substrate SUB, the first light emitting element electrode LDE1 may be formed as a transparent conductive layer.

A set of the first light emitting element electrode LDE1, the light emitting layer EML, and the second light emitting element electrode LDE2, which are described above, may be designated as the light emitting element.

The encapsulation layer TFE may be provided over the second light emitting element electrode LDE2. The encapsulation layer TFE may be provided as a single layer, but may also be provided as a multi-layer. In this embodiment, the encapsulation layer TFE may be provided with first to third encapsulation layers ENC1, ENC2, ENC3. The first to third encapsulation layers ENC1, ENC2, and ENC3 may be made of an organic material and/or an inorganic material. The third encapsulation layer ENC3 located at an outermost portion of the encapsulation layer TFE may be made of an inorganic material. For example, the first encapsulation layer ENC1 may be an inorganic layer made of an inorganic material, the second encapsulation layer ENC2 may be an organic layer made of an organic material, and the third encapsulation layer ENC3 may be an inorganic layer made of an inorganic material. As compared with the organic material, less moisture or oxygen penetrates into the inorganic material, but the inorganic material may crack due to its limited flexibility. The first encapsulation layer ENC1 and the third encapsulation layer ENC3 are formed of an inorganic material, and the second encapsulation layer ENC2 is formed of an organic material, so that the propagation of cracks can be prevented. The layer made of the organic material, e.g., the second encapsulation layer ENC2 may be completely covered by the third encapsulation layer ENC3 such that an end portion of the second encapsulation layer ENC2 is not exposed to the outside. The organic material may include organic insulating materials such as a polyacryl-based compound, a polyimide-based compound, a fluorine-based compound such as Teflon, and a benzocyclobutene-based compound. The inorganic material may include inorganic insulating materials such as polysiloxane, silicon nitride, silicon oxide, and silicon oxynitride.

The light emitting layer EML constituting the light emitting element may be easily damaged by moisture, oxygen or the like from the outside. The encapsulation layer TFE covers the light emitting layer EML, to protect the light emitting layer EML. The encapsulation layer TFE may cover the display area DA, and extend up to the non-display area NDA at the outside of the display area DA. In the case of insulating layers made of an organic material, the insulating layers are advantageous in terms of flexibility, elasticity, and the like, but moisture or oxygen easily penetrates into the insulating layers, as compared with insulating layers made of an inorganic material. In an embodiment of the present disclosure, to prevent penetration of moisture or oxygen through the insulating layers made of the organic material, end portions of the insulating layers made of the organic material may be covered by the insulating layers made of the inorganic material. For example, the first via layer VIA1, the second via layer VIA2, and the pixel defining layer PDL, which are made of an organic material, do not continuously extend, and may be covered by the first encapsulation layer ENC1. Accordingly, a top surface of the pixel defining layer PDL and side surfaces of the first via layer VIA1, the second via layer VIA2, and the pixel defining layer PDL are encapsulated by the encapsulation layer TFE including an inorganic material, so that exposure to the outside can be prevented.

However, whether the encapsulation layer TFE is provided as a multi-layer or the material of the encapsulation layer TFE is not limited thereto, and may be variously changed. For example, the encapsulation layer TFE may include a plurality of organic material layers and a plurality of inorganic material layers, which are alternately stacked.

A first sensing electrode layer ISM1 may be located on the encapsulation layer TFE. The first sensing electrode layer ISM1 may directly contact the encapsulation layer TFE. In some embodiments of the present disclosure, an additional buffer layer may be located between the first sensing electrode layer ISM1 and the encapsulation layer TFE. The first sensing electrode layer ISM1 may be configured as a metal layer including Ag, Mg, Al, Pt, Pd, Au, Ni, Nd, Ir, Cr, etc., and/or a transparent conductive layer including indium tin oxide (ITO), indium zinc oxide (IZO), zinc oxide (ZnO), indium tin zinc oxide (ITZO), etc. The first sensing electrode layer ISM1 may also overlap the first light emitting element electrode LDE1.

A first sensing insulating layer ISI1 may be located over the first sensing electrode layer IMS1. The first sensing insulating layer ISI1 may be an inorganic insulating layer made of an inorganic material. The inorganic material may include inorganic insulating materials such as polysiloxane, silicon nitride, silicon oxide, and silicon oxynitride.

A second sensing electrode layer ISM2 may be located on the first sensing insulating layer ISI1. The second sensing electrode layer ISM2 may overlap the pixel defining layer PDL. The second sensing electrode layer ISM2 may be configured as a metal layer including Ag, Mg, Al, Pt, Pd, Au, Ni, Nd, Ir, Cr, etc., and/or a transparent conductive layer including indium tin oxide (ITO), indium zinc oxide (IZO), zinc oxide (ZnO), indium tin zinc oxide (ITZO), etc.

Various input sensing units may be configured using the first sensing electrode layer ISM1, the first sensing insulating layer ISI1, and the second sensing electrode layer ISM2, which will be described later with reference to FIGS. 22 to 24.

In the embodiment shown in FIG. 20, the second sensing electrode layer ISM2 may be patterned to constitute a first pattern IST1a of the first sensing line IST1.

A second sensing insulating layer ISI2 may be located over the second sensing electrode layer ISM2. The second sensing insulating layer ISI2 may extend to the second bending area BA2. The second sensing insulating layer ISI2 may be configured as an organic layer. For example, the organic material may include an organic insulating material such as a polyacryl-based compound, a polyimide-based compound, a fluorine-based compound such as Teflon, or a benzocyclobutene-based compound. For example, the second sensing insulating layer ISI2 may include polymethyl methacrylate, polydimethylsiloxane, polyimide, acrylate, polyethylene terephthalate, polyethylene naphthalate, etc.

Next, the non-display area NDA, the first additional area ADA1, and the second additional area ADA2 will be described. The non-display area NDA and the first additional area ADA1 are described without distinguishing the non-display area NDA and the first additional area ADA1 from each other. Hereinafter, in description of the non-display area NDA and the second additional area ADA2, descriptions of portions which have already been described above will be omitted or simplified.

A dam DAM may be located at a boundary of the second encapsulation layer ENC2. For example, the dam DAM may be located between a planarization layer FLT and the second encapsulation layer ENC2. The dam DAM may have a double-layered structure. For example, the dam DAM may include a first dam DAM1 and a second dam DAM2. For example, the first and second dams DAM1 and DAM2 may be made of an organic material. Each of the first and second dams DAM1 and DAM2 may correspond to any one of the first via layer VIA1, the second via layer VIA2, and the pixel defining layer PDL. For example, when the first dam DAM1 is formed of the same material as the first via layer VIA1 through the same process as the first via layer VIA1, the second dam DAM2 may be formed of the same material as the second via layer VIA2 or the pixel defining layer PDL through the same process as the second via layer VIA2 or the pixel defining layer PDL. In another example, when the first dam DAM1 is formed of the same material as the second via layer VIA2 through the same process as the second via layer VIA2, the second dam DAM2 may be formed of the same material as the pixel defining layer PDL through the same process as the pixel defining layer PDL. In addition, when a spacer is formed on the pixel defining layer PDL of the display area DA, the dam DAM may be formed by using the same material as the spacer.

The dam DAM prevents the organic material of the second encapsulation layer ENC2 having strong liquidity from overflowing to the outside of the dam DAM. The first and third encapsulation layers ENC1 and ENC3, which are made of the inorganic material, extend while covering the data DAM, so that the first and third encapsulation layers ENC1 and ENC3 may be adhered with the substrate SUB or other layers on the top of the substrate SUB.

A first pad PDE1 is located on the substrate SUB, and may be spaced apart from the planarization layer FLT. The planarization layer FLT may overlap the entire second bending area BA2. The first pad PDE1 may be supported by a second insulating layer group ING2. Insulating layers of the second insulating layer group ING2 may respectively correspond to those of the first insulating layer group ING1. The first pad PDE1 may include a first pad electrode PDE1$a$ and a second pad electrode PDE1$b$. The first pad electrode PDE1$a$ may be made of the same material as the first connection pattern CNP1. The second pad electrode PDE1$b$ may be made of the same material as the second connection pattern CNP2.

The planarization layer FLT is located on the substrate SUB, and may be spaced apart from an area covered by the encapsulation layer TFE. The planarization layer FLT may be an organic insulating layer made of an organic material. The organic material may include an organic insulating material such as a polyacryl-based compound, a polyimide-based compound, a fluorine-based compound such as Teflon, or a benzocyclobutene-based compound.

In this embodiment, the planarization layer FLT may be formed before the first connection pattern CNP1 is formed after the interlayer insulating layer ILD is formed. Therefore, the planarization layer FLT and the first via layer VIA1 may be formed through different processes. In some embodiments of the present disclosure, the planarization layer FLT and the first via layer VIA1 may include different organic materials.

One end of the planarization layer FLT may cover the first insulating layer group ING1. In addition, a portion of the planarization layer FLT corresponding to the second banding area BA2 may fill a first trench TCH1 between the first insulating layer group ING1 and the second insulating layer group ING2.

Since inorganic insulating layers have high hardness and small flexibility, as compared with organic insulating layers, the probability that cracks will occur in the inorganic insulating layers is relatively high. When cracks occur in the inorganic insulating layers, the cracks may propagate to lines on the inorganic insulating layers. As a result, a failure such as line disconnection may occur.

Accordingly, as shown in FIG. 20, the inorganic insulating layers are removed in the second bending area BA2, so that the first trench TCH1 can be formed, and the first insulating layer group ING1 and the second insulating layer group ING2 can be distinguished from each other. In this embodiment, a case where all inorganic insulating layers corresponding to the area of the first trench TCH1 are removed has been illustrated. However, in another embodiment of the present disclosure, some inorganic insulating layers may remain. The remaining inorganic insulating layers may include a slit, so that bending stress can be dispersed.

A second pattern IST1$b$ of the first sensing line IST1 may extend on the planarization layer FLT, and be electrically connected to the first pad PDE1. In this embodiment, the second pattern IST1$b$ may be formed of the same material as the first connection pattern CNP1 through the same process as the first connection pattern CNP1.

A first line protective layer LPL1 may cover the planarization layer FLT and the second pattern IST1$b$. In addition, a second line protective layer LPL2 may cover the first line protective layer LPL1. In some embodiments of the present disclosure, the configuration of the second line protective layer LPL2 may be omitted. The first and second line protective layers LPL1 and LPL2 may be made of an organic material. Each of the first and second line protective layers LPL1 and LPL2 may correspond to any one of the first via layer VIA1, the second via layer VIA2, and the pixel defining layer PDL. For example, when the first line protective layer LPL1 is formed of the same material as the first via layer VIA1 through the same process as the first via layer VIA1, the second line protective layer LPL2 may be formed of the same material as the second via layer VIA2 or the pixel defining layer PDL through the same process as the second via layer VIA2 or the pixel defining layer PDL. In another example, when the first line protective layer LPL1 is formed of the same material as the second via layer VIA2 through the same process as the second via layer VIA2, the second line protective layer LPL2 may be formed of the same material as the pixel defining layer PDL through the same process as the pixel defining layer PDL.

The first and second line protective layers LPL1 and LPL2 and the first sensing insulating layer ISI1 may include a first opening OPN1 exposing the second pattern IST1$b$. For example, the second pattern IST1$b$ may be located in the bottom of the first opening OPN1 on the planarization layer FLT.

The first pattern IST1$a$ may be connected to the second pattern IST1$b$ through the first opening OPN1. The first pattern IST1$a$ may directly contact the second pattern IST1$b$ in the first opening OPN1. In accordance with this embodiment, a height of the second pattern IST1$b$ located on one end of the first insulating layer group ING1 and the planarization layer FLT may be greater than that of the second pattern IST1$b$ located on the planarization layer FLT corresponding to the first trench TCH1.

Thus, the first pattern IST1$a$ and the second pattern IST1$b$ can be directly connected to each other without another bridge pattern. Since the bridge pattern does not exist, connection reliability between the first pattern IST1$a$ and the second pattern IST1$b$ is improved. Further, the length of the non-display area NDA can be decreased by the length of the bridge pattern. Accordingly, a dead space can be decreased, and a thin bezel can be easily implemented.

A third pattern IST1c of the first sensing line IST1 may connect the first pad PDE1 and the second pattern IST1b to each other. The third pattern IST1c may be formed of the same material as the gate electrode GE of the transistor through the same process as the gate electrode GE of the transistor. In some embodiments of the present disclosure, the third pattern IST1c may be formed of the same material as the upper electrode UE through the same process as the upper electrode UE. In some embodiments of the present disclosure, an odd-numbered third pattern IST1c may be formed of the same material as the gate electrode GE of the transistor through the same process as the gate electrode GE of the transistor, and an even-numbered third pattern IST1c may be formed of the same material as the upper electrode UE through the same process as the upper electrode UE. On the contrary, the even-numbered third pattern IST1c may be formed of the same material as the gate electrode GE of the transistor through the same process as the gate electrode GE of the transistor, and the odd-numbered third pattern IST1c may be formed of the same material as the upper electrode UE through the same process as the upper electrode UE. Accordingly, a short circuit between adjacent lines can be prevented.

The second insulating layer group ING2 may include a second opening OPN2 exposing the third pattern IST1c. In addition, the planarization layer FLT may include an opening corresponding to the second opening OP2. The second pattern IST1b may be connected to the third pattern IST1c though the second opening OP2.

Figure 21:
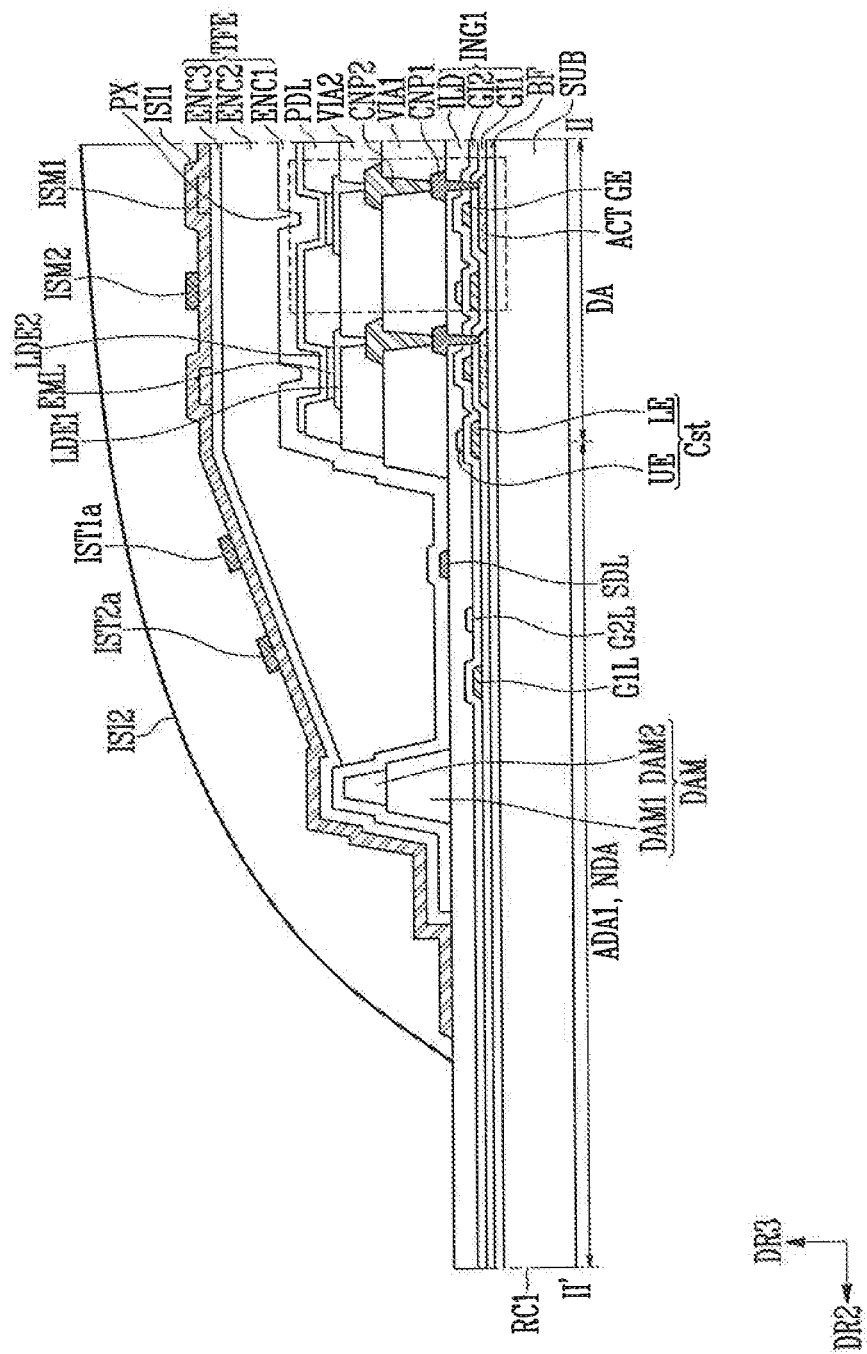

FIG. 21 illustrates an embodiment of a section corresponding to line II-II' shown in FIG. 19.

The line II-II' shown in FIG. 19 may correspond to the first bending axis BX1. However, the same embodiment may be applied to not only the first side surface RC1 but also the second side surface RC2.

The display lines DST may be configured as a single-layered line or a multi-layered line by using at least one of lines G1L, G2L, and SDL. The line G1L may be formed of the same material as the gate electrode GE through the same process as the gate electrode GE. The line G2L may be formed of the same material as the upper electrode UE through the same process as the upper electrode UE. The line SDL may be formed of the same material as the first connection pattern CNP1 through the same process as the first connection pattern CNP1.

The patterns IST1a and IST2a of the sensing lines IST1 and IST2 are located on the encapsulation layer TFE and the first sensing insulating layer ISI1 (with respect to the third direction DR3), and may be located between the dam DAM and the display area DA (with respect to the second direction DR2). The first sensing insulating layer ISI1 may be located between the encapsulation layer TFE and the sensing lines IST1 and IST2.

Figure 22:
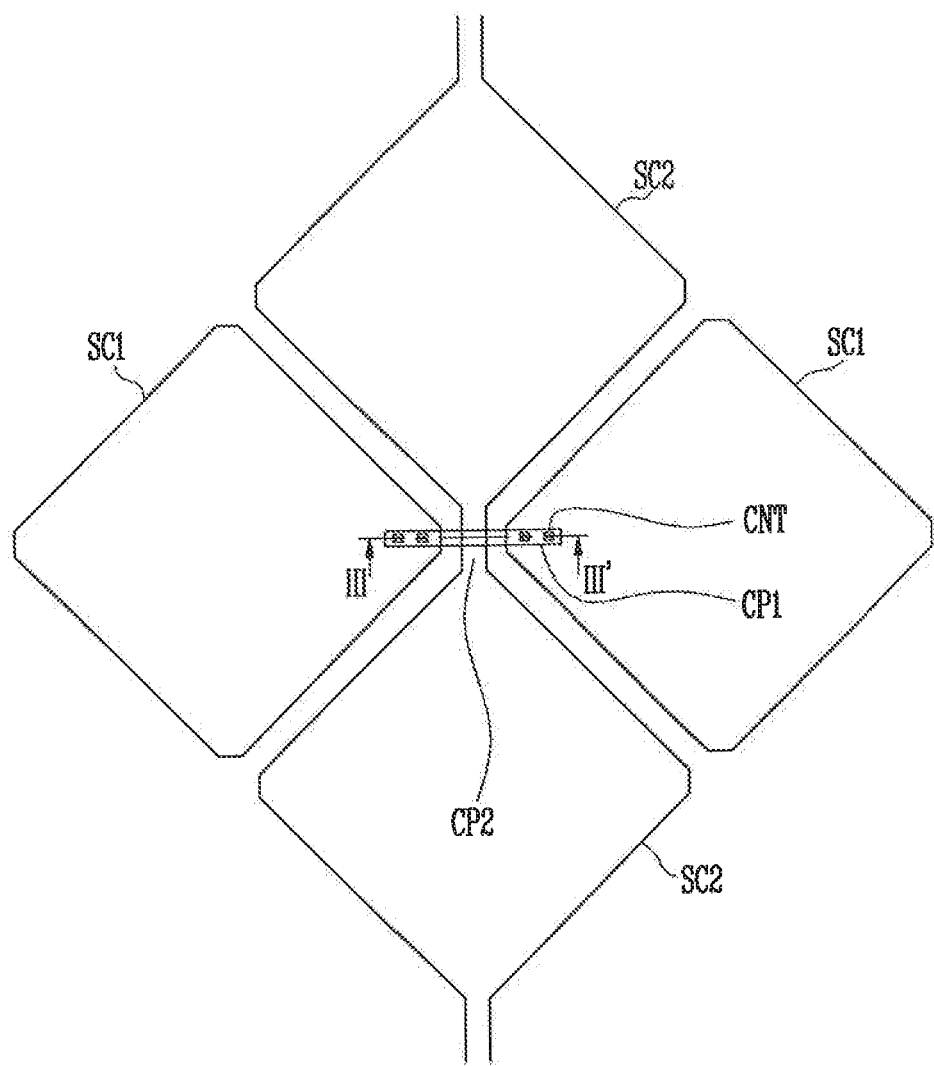
Figure 23:
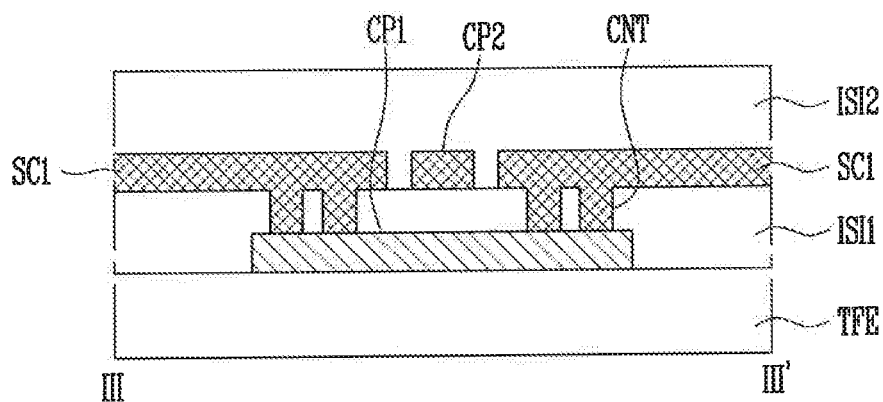

FIGS. 22 and 23 are views illustrating sensing electrodes and bridge electrodes in accordance with an embodiment of the present disclosure. FIG. 23 is a sectional view taken along line shown in FIG. 22.

Bridge electrodes CP1 may be located on the encapsulation layer TFE by patterning the first sensing electrode layer ISM1.

The first sensing insulating layer ISI1 covers the bridge electrodes CP1, and may include contact holes CNT exposing some of the bridge electrodes CP1.

First sensing electrodes SC1 and second sensing electrodes SC2 may be formed on the first sensing insulating layer ISI1 by patterning the second sensing electrode layer ISM2. The first sensing electrodes SC1 may be connected to the bridge electrode CP1 through the contact holes CNT.

The second sensing electrodes SC2 may have a connection pattern CP2 in the same layer by patterning the second sensing electrode layer ISM2. In other words, the connection pattern CP2 may be formed on the first sensing insulating layer ISI1. Therefore, any separate bridge electrode may be unnecessary when the second sensing electrodes SC2 are connected to each other.

In some embodiments of the present disclosure, each of the sensing electrodes SC1 and SC2 may cover a plurality of pixels PX. When each of the sensing electrodes SC1 and SC2 is an opaque conductive layer, each of the sensing electrodes SC1 and SC2 may include a plurality of openings capable of exposing the plurality of pixels PX covered thereby. For example, each of the sensing electrodes SC1 and SC2 may be configured in a mesh form. When each of the sensing electrodes SC1 and SC2 is a transparent conductive layer, each of the sensing electrodes SC1 and SC2 may be configured in the form of a plate which does not have an opening.

Figure 24:
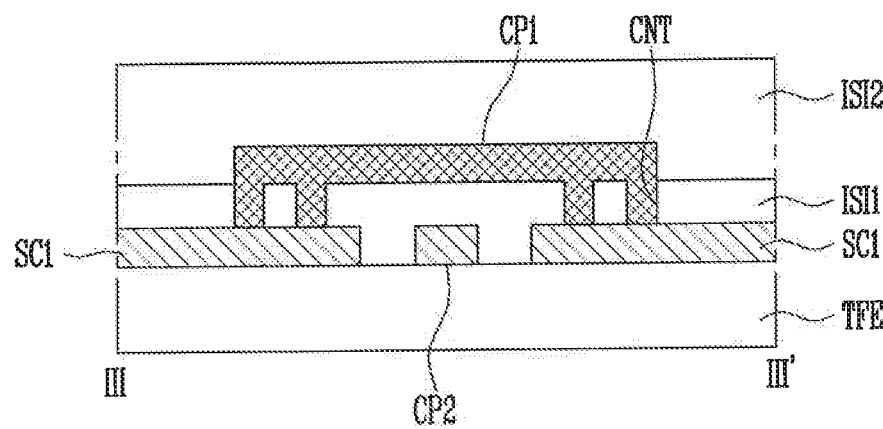

FIG. 24 is a view illustrating sensing electrodes and bridge electrodes in accordance with another embodiment of the present disclosure.

FIG. 24 is a sectional view taken along line shown in FIG. 22.

First sensing electrodes SC1 and second sensing electrodes SC2 may be located on the encapsulation layer TFE by patterning the first sensing electrode layer ISM1. In other words, the first sensing electrodes SC1 and second sensing electrodes SC2 may be located on the same layer.

The first sensing insulating layer ISI1 covers the first sensing electrodes SC1 and the second sensing electrodes SC2, and may include contact holes CNT exposing some of the first and second sensing electrodes SC1 and SC2.

Bridge electrodes CP1 may be located on the first sensing insulating layer ISI1 by patterning the second sensing electrode layer ISM2. The bridge electrodes CP1 may be connected to the first sensing electrodes SC1 through the contact holes CNT.

Figure 25:
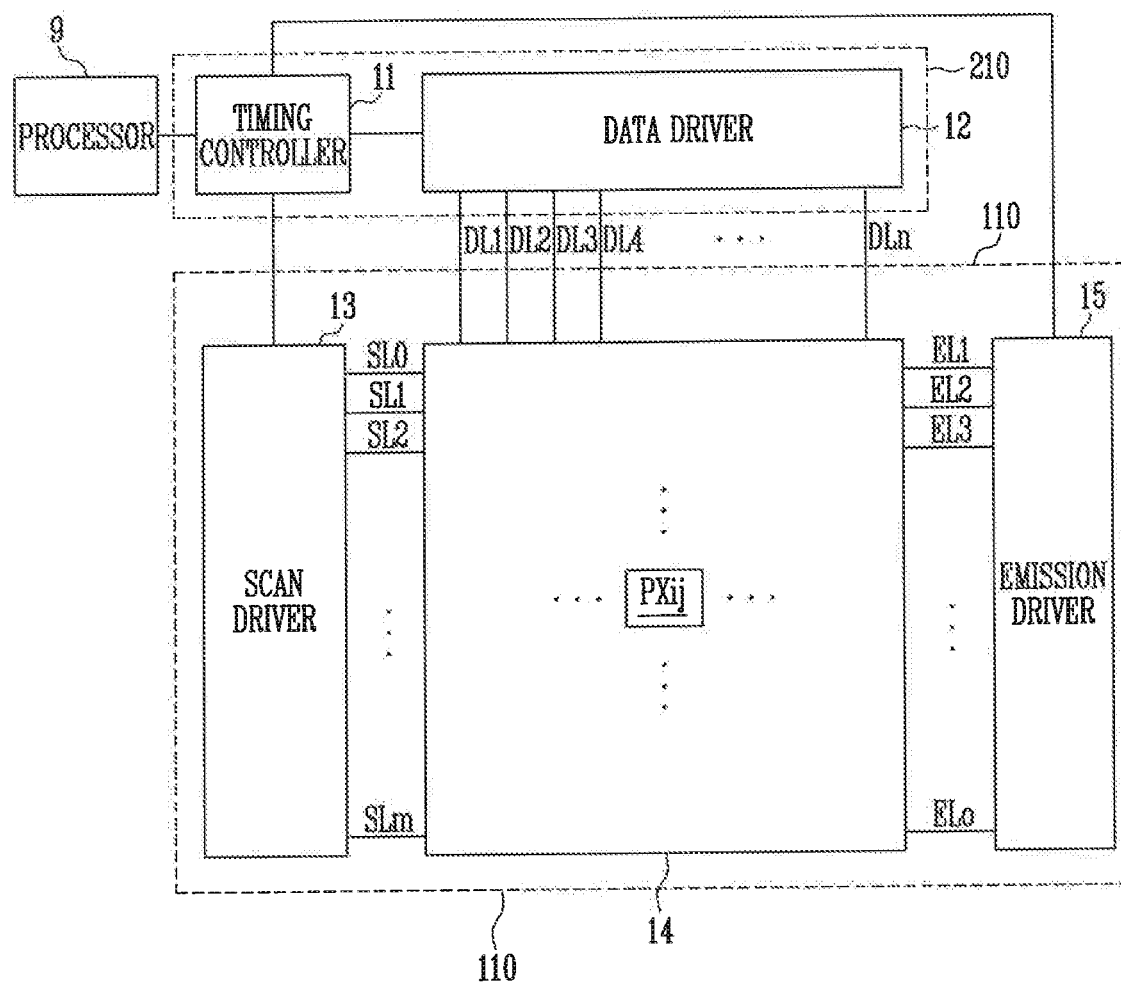
FIGS. 25, 26 and 27 are diagrams illustrating a display device including a pixel in accordance with another embodiment of the present disclosure.
Figure 26:
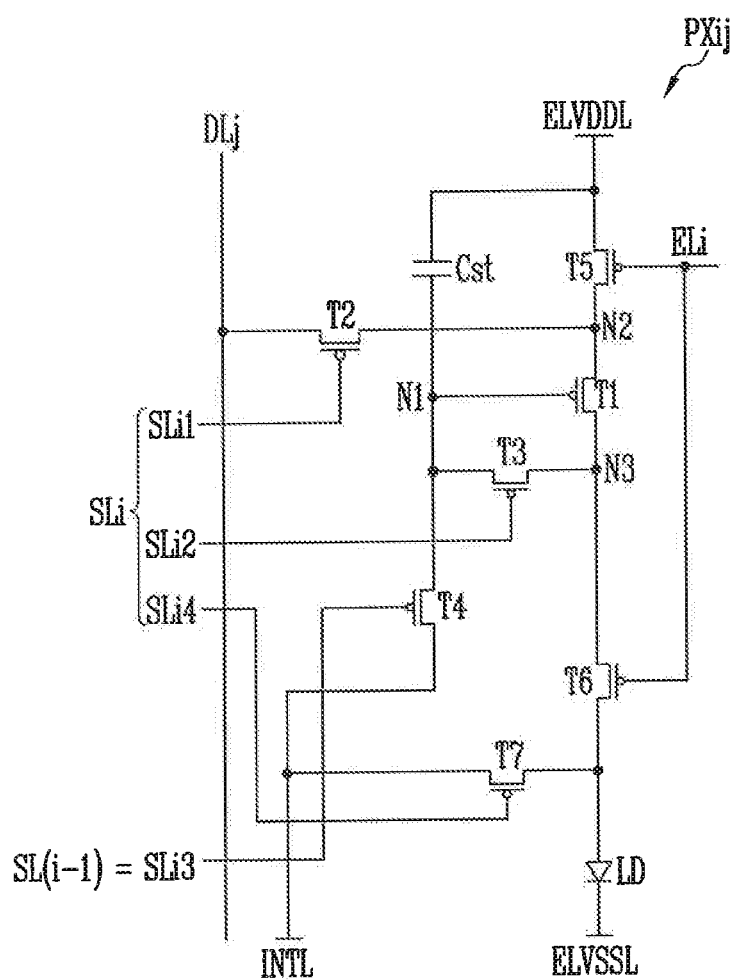
Figure 27:
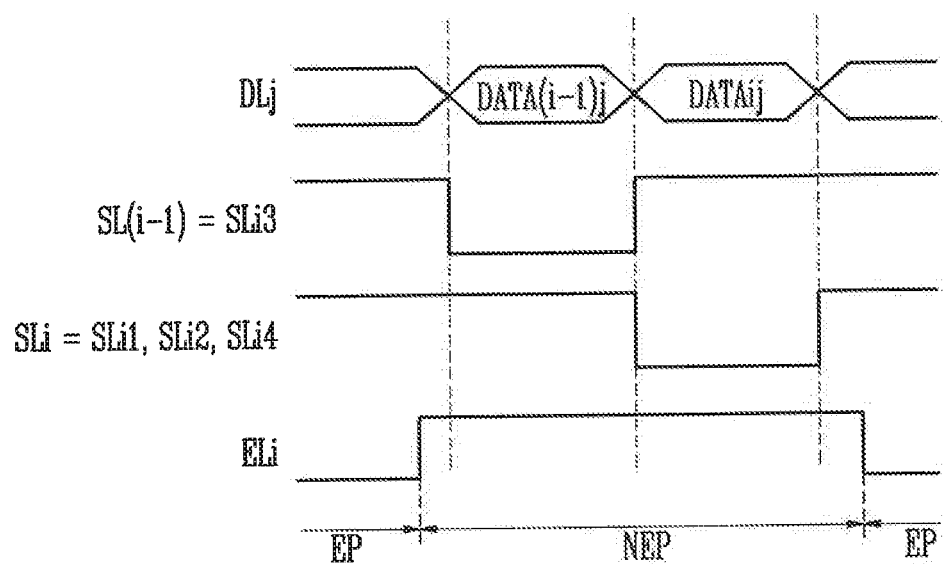

FIGS. 25 to 27 are diagrams illustrating a display device including a pixel in accordance with another embodiment of the present disclosure.

FIG. 25 is a diagram illustrating a display unit and a display driver in accordance with an embodiment of the present disclosure.

Referring to FIG. 25, the display driver 210 may include a data driver 12 and a timing controller 11, and the display unit 110 may include a scan driver 13, a pixel unit 14, and an emission driver 15. However, as described above, whether functional units are to be integrated in one IC, to be integrated in a plurality of ICs, or to be mounted on the display substrate 111 may be variously configured according to specifications of the display device 1.

The timing controller 11 may receive grayscales for each display frame period and timing signals from a processor 9. The processor 9 may correspond to at least one of a Graphics Processing Unit (GPU), a Central Processing Unit (CPU), an Application Processor (AP), and the like. The timing signals may include a vertical synchronization signal, a horizontal synchronization signal, a data enable signal, and the like.

Each cycle of the vertical synchronization signal may correspond to each display frame period. Each cycle of the horizontal synchronization signal may correspond to each horizontal period. The grayscales may be supplied by using a horizontal line as a unit in each horizontal period, corresponding to a pulse having an enable level of the data enable signal. The horizontal line may be pixels (e.g., a pixel row) connected to the same scan line and the same emission line.

The timing controller 11 may render grayscales to correspond to the specifications of the display device 1. For example, the processor 9 may provide a red grayscale, a green grayscale, and a blue grayscale with respect to each unit dot. For example, when the pixel unit 14 has a RGB stripe structure, pixels may correspond one-to-one to the respective grayscales. Therefore, it may be unnecessary to render the grayscales. However, for example, when the pixel unit 14 has a PENTILE™ structure, adjacent unit dots share a pixel with each other, and hence the pixels may not correspond one-to-one to the respective grayscales. Therefore, it may be necessary to render the grayscales. Grayscales which are rendered or are not rendered may be provided to the data driver 12. In addition, the timing controller 11 may provide a data control signal to the data driver 12. Further, the timing controller 11 may provide a scan control signal to the scan driver 13, and provide an emission control signal to the emission driver 15.

The data driver 12 may generate data voltages (e.g., data signals) to be provided to data lines DL1, DL2, DL3, DL4, . . . , and DLn by using the grayscales and the data control signal, which are received from the timing controller 11. Here, n may be an integer greater than 0.

The scan driver 13 may generate scan signals to be provided to scan lines SL0, SL1, SL2, . . . , and SLm by using a scan control signal (e.g., a clock signal, a scan start signal, and the like) received from the timing controller 11. The scan driver 13 may sequentially supply the scan signals having a pulse of a turn-on level to the scan lines SL0 to SLm. The scan driver 13 may include scan stages configured in the form of shift registers. The scan driver 13 may generate the scan signals in a manner that sequentially transfers the scan start signal in the form of a pulse of the turn-on level to a next scan stage under the control of the clock signal. Here, m may be an integer greater than 0.

The emission driver 15 may generate emission signals to be provided to emission lines EL1, EL2, EL3, . . . , EL0 by using an emission control signal (e.g., a clock signal, an emission stop signal, and the like) received from the timing controller 11. The emission driver 15 may sequentially supply the emission signals having a pulse of a turn-off level to the emission lines EL1 to EL0. The emission driver 15 may include emission stages configured in the form of shift registers. The emission driver 15 may generate the emission signals in a manner that sequentially transfers the emission stop signal in the form of a pulse of the turn-off level to a next emission stage under the control of the clock signal. Here, o may be an integer greater than 0.

The pixel unit includes pixels. Each pixel PXij may be connected to a corresponding data line, a corresponding scan line, and a corresponding emission line. The pixels may include pixels emitting light of a first color, pixels emitting light of a second color, and pixels emitting light of a third color. The first color, the second color, and the third color may be different colors. For example, the first color may be one color among red, green, and blue, the second color may be one color except the first color among red, green, and blue, and the third color may be the other color except the first color and the second color among red, green, and blue. In addition, magenta, cyan, and yellow instead of red, green, and blue may be used as the first to third colors.

FIG. 26 is a diagram illustrating a pixel in accordance with an embodiment of the present disclosure.

Referring to FIG. 26, the pixel PXij may include transistors T1, T2, T3, T4, T5, T6, and T7, a storage capacitor Cst, and a light emitting element LD.

Hereinafter, a circuit implemented with a P-type transistor is described as an example. However, the circuit may be implemented with an N-type transistor by changing the polarity of a voltage applied to a gate terminal. Similarly, the circuit may be implemented with a combination of the P-type transistor and the N-type transistor. The P-type transistor refers to a transistor in which an amount of current flowing when the difference in voltage between a gate electrode and a source electrode increases in a negative direction increases. The N-type transistor refers to a transistor in which an amount of current flowing when the difference in voltage between a gate electrode and a source electrode increases in a positive direction increases. The transistor may be configured in various forms including a Thin Film Transistor (TFT), a Field Effect Transistor (FET), a Bipolar Junction Transistor (BJT), and the like.

A gate electrode of the first transistor T1 may be connected to a first node N1, a first electrode of the first transistor T1 may be connected to a second node N2, and a second electrode of the first transistor T1 may be connected to a third node N3. The first transistor T1 may be referred to as a driving transistor.

A gate electrode of a second transistor T2 may be connected to a scan line SLi1, a first electrode of the second transistor T2 may be connected to a data line DLj, and a second electrode of the second transistor T2 may be connected to the second node N2 and the first electrode of the first transistor T1. The second transistor T2 may be referred to as a scan transistor.

A gate electrode of a third transistor T3 may be connected to a scan line SLi2, a first electrode of the third transistor T3 may be connected to the first node N1 and the gate electrode of the first transistor T1, and a second electrode of the third transistor T3 may be connected to the third node N3. The third transistor T3 may be referred to as a diode connection transistor.

A gate electrode of a fourth transistor T4 may be connected to a scan line SLi3, a first electrode of the fourth transistor T4 may be connected to the first node N1 and the first electrode of the third transistor T3, and a second electrode of the fourth transistor T4 may be connected to an initialization line INTL. The fourth transistor T4 may be referred to as a gate initialization transistor.

A gate electrode of the fifth transistor T5 may be connected to an ith emission line ELi, a first electrode of the fifth transistor T5 may be connected to a first power line ELVDDL, and a second electrode of the fifth transistor T5 may be connected to the second node N2. The fifth transistor T5 may be referred to as an emission transistor. In another embodiment of the present disclosure, the gate electrode of the fifth transistor T5 may be connected to an emission line different from that connected to a gate electrode of a sixth transistor T6.

The gate electrode of the sixth transistor T6 may be connected to the ith emission line ELi, a first electrode of the sixth transistor T6 may be connected to the third node N3 and the second electrode of the first transistor T1, and a second electrode of the sixth transistor T6 may be connected to an anode of the light emitting element LD. The sixth transistor T6 may be referred to as an emission transistor. In another embodiment of the present disclosure, the gate electrode of the sixth transistor T6 may be connected to an emission line different from that connected to the gate electrode of the fifth transistor T5.

A gate electrode of a seventh transistor T7 may be connected to a scan line SLi4, a first electrode of the seventh transistor T7 may be connected to the initialization line INTL, and a second electrode of the seventh transistor T7 may be connected to the anode of the light emitting element LD. The seventh transistor T7 may be referred to as a light emitting element initialization transistor.

A first electrode of the storage capacitor Cst may be connected to the first power line ELVDDL, and a second electrode of the storage capacitor Cst may be connected to the first node N1 and the first electrode of the first transistor T1.

The anode of the light emitting element LD may be connected to the second electrode of the sixth transistor T6, and a cathode of the light emitting element LD may be connected to a second power line ELVSSL. The light emitting element LD may be a light emitting diode. The light emitting element LD may be an organic light emitting diode, an inorganic light emitting diode, a quantum dot/well light emitting diode, or the like. The light emitting element LD may emit light of any one color among a first color, a second color, and a third color. In addition, in this embodiment, only one light emitting element LD is provided in each pixel. However, in another embodiment of the present disclosure, a plurality of light emitting elements may be provided in each pixel. The plurality of light emitting elements may be connected in series, parallel, series/parallel, or the like.

A first power voltage may be applied to the first power line ELVDDL, a second power voltage may be applied to the second power line ELVSSL, and an initialization voltage may be applied to the initialization line INTL. For example, the first power voltage may be higher than the second power voltage. For example, the initialization voltage may be equal to or higher than the second power voltage. For example, the initialization voltage may correspond to a data voltage having the smallest magnitude among magnitudes of data voltages which can be provided. In another example, the magnitude of the initialization voltage may be smaller than those of the data voltages which can be provided.

FIG. 27 is a diagram illustrating an example driving method of the pixel shown in FIG. 26.

Hereinafter, for convenience of description, it is assumed that the scan lines SLi1, SLi2, and SLi4 correspond to an ith scan line SLi, and the scan line SLi3 is an (i−1)th scan line SL(i−1). However, in some embodiments of the present disclosure, a connection relationship between the scan lines SLi1, SLi2, SLi3, and SLi4 may be different. For example, the scan line SLi4 may be an (i−1)th scan line or an (i+1)th scan line.

First, an emission signal having a turn-off level (e.g., a logic high level) is applied to the ith emission line ELi, a data voltage DATA(i−1)j for an (i−1)th pixel is applied to the data line DLL and a scan signal having a turn-on level (e.g., a logic low level) is applied to the scan line SLi3. High/low of a logic level may be changed according to whether a transistor is of a P-type or an N-type.

Since a scan signal having the turn-off level is applied to the scan lines SLi1 and SLi2, the second transistor T2 is in a turn-off state, and the data voltage DATA(i−1)j for the (i−1)th pixel is prevented from being input to the pixel PXij.

Since the fourth transistor T4 is in a turn-on state, the first node N1 is connected to the initialization line INTL, so that a voltage of the first node N1 is initialized. Since the emission signal having the turn-off level is applied to the emission line ELi, the transistors T5 and T6 are in the turn-off state, and unnecessary emission of the light emitting element LD in a process of applying the initialization voltage is prevented.

Next, a data voltage DATAij for an ith pixel PXij is applied to the data line DLj, and the scan signal having the turn-on level is applied to the scan lines SLi1 and SLi2. Accordingly, the second, first and third transistors T2, T1, and T3 are in a conduction state, and the data line DLj and the first node N1 are electrically connected to each other. Therefore, a compensation voltage obtained by subtracting a threshold voltage of the first transistor T1 from the data voltage DATAij is applied to the second electrode of the storage capacitor Cst (e.g., the first node N1), and the storage capacitor Cst maintains a voltage corresponding to the difference between the first power voltage and the compensation voltage. Such a period may be referred to as a threshold voltage compensation period or a data write period.

In addition, when the scan line SLi4 is an ith scan line, the seventh transistor T7 is in the turn-on state. Hence, the anode of the light emitting element LD and the initialization line INTL are connected to each other, and the light emitting element LD is initialized to a charge amount corresponding to the voltage difference between the initialization voltage and the second power voltage.

Subsequently, since the emission signal having the turn-on level is applied to the ith emission line ELi, the fifth and sixth transistors T5 and T6 may be electrically connected to each other. Therefore, a driving current path is formed, through which the first power line ELVDDL, the fifth transistor T5, the first transistor T1, the sixth transistor T6, the light emitting element LD, and the second power line ELVSSL are connected to each other.

An amount of driving current flowing through the first electrode and the second electrode of the first transistor T1 is adjusted according to the voltage maintained in the storage capacitor Cst. The light emitting element LD emits light with a luminance corresponding to the amount of driving current. The light emitting element LD emits light until before the emission signal having the turn-off level is applied to the emission line ELi.

When an emission signal has the turn-on level, pixels receiving the corresponding emission signal may be in a display state. Therefore, the period in which the emission signal has the turn-on level may be referred to as an emission period EP (or emission allow period). In addition, when an emission signal has the turn-off level, pixels receiving the corresponding emission signal may be in a non-display state. Therefore, the period in which the emission signal has the turn-off level may be referred to as a non-emission period NEP (or emission inhibit period).

The non-emission period NEP described in FIG. 27 is used to prevent the pixel PXij from emitting light with an unwanted luminance while passing through the initialization period and the data write period.

One or more non-emission periods NEP may be additionally provided while data written to the pixel PXij is maintained (e.g., one frame period). This is for the purpose of reducing the emission period EP of the pixel PXij, thereby effectively expressing a low grayscale or gently blurring motion of an image.

In the display device and the driving method thereof in accordance with the present disclosure, timings of sensing signals and display signals can be changed while minimizing interference, using the existing control signal.

Example embodiments of the present disclosure have been disclosed herein, and although specific terms are employed, they are used and are to be interpreted in a generic and descriptive sense and not for purpose of limitation. In some instances, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device, comprising:
    pixels;
    a data driver configured to start outputting data voltages to at least some of the pixels at a first time during a horizontal period, and end outputting the data voltages at a second time during the horizontal period;
    sensors; and
    a sensor driver configured to change a logic level of a sensing signal of at least some of the sensors at a third time different from the first time and the second time during the horizontal period,
    wherein at least one of the first time, the second time, and the third time is changed according to a number of times a logic level of a vertical synchronization signal is changed while a logic level of a horizontal synchronization signal is maintained.

2. The display device of claim 1, wherein the horizontal period is from a time at which the horizontal synchronization signal is changed from a first logic level to a second logic level to a next time at which the horizontal synchronization signal is changed from the first logic level to the second logic level, and
    wherein the logic level of the horizontal synchronization signal is the second logic level.

3. The display device of claim 2, wherein, in the horizontal period, the vertical synchronization signal is changed at least once from a third logic level to a fourth logic level, while the horizontal synchronization signal is maintained at the second logic level, and
    wherein, in the horizontal period, a period in which the vertical synchronization signal is maintained at the fourth logic level is shorter than a period in which the horizontal synchronization signal is maintained at the second logic level.

4. The display device of claim 3, wherein, in the horizontal period, the vertical synchronization signal is maintained at the third logic level, while the horizontal synchronization signal is maintained at the first logic level.

5. The display device of claim 3, further comprising a scan driver configured to output a scan signal having a turn-on level to at least some of the pixels from a fourth time to a fifth time during the horizontal period,
    wherein the logic level of the sensing signal is maintained from the second time to the fifth time.

6. The display device of claim 1, wherein an output period of the data voltages when the number of times the logic level of the vertical synchronization $signal_{[RDR6]}$ is changed is n times and an output period of the data voltages when the number of times the logic level of the vertical synchronization $signal_{[RDR7]}$ is changed is m times have the same length and have different phases with respect to the horizontal period, and
    wherein the n and the m are different positive integers.

7. The display device of claim 6, wherein a level maintenance period of the sensing signal when the number of times the logic level of the vertical synchronization $signal_{[RDR8]}$ is changed is the n times and a level maintenance period of the sensing signal when the number of times the logic level of the vertical synchronization $signal_{[RDR9]}$ is changed is the m times have the same length and have different phases with respect to the horizontal period.

8. The display device of claim 1, wherein an output period of the data voltages when the number of times the logic level of the vertical synchronization $signal_{[RDR10]}$ is changed is n times and an output period of the data voltages when the number of times the logic level of the vertical synchronization $signal_{[RDR11]}$ is changed is m times have different lengths with respect to the horizontal period, and
    wherein the n and the m are different positive integers.

9. The display device of claim 8, wherein a level maintenance period of the sensing signal when the number of times the logic level of the vertical synchronization $signal_{[RDR12]}$ is changed is the n times and a level maintenance period of the sensing signal when the number of times the logic level of the vertical synchronization $signal_{[RDR13]}$ is changed is the m times have different lengths with respect to the horizontal period.

10. The display device of claim 2, wherein the vertical synchronization signal has a third logic level or a fourth logic level, and
    wherein a frame period is changed with respect to when the horizontal synchronization signal has the first logic level and the vertical synchronization signal has the fourth logic level.

11. A method for driving a display device, the method comprising:
    starting, by a data driver, outputting of data voltages to at least some pixels at a first time during a horizontal period, and ending outputting of the data voltages at a second time during the horizontal period; and
    changing, by a sensor driver, a logic level of a sensing signal of at least some sensors at a third time different from the first time and the second time during the horizontal period,
    wherein at least one of the first time, the second time, and the third time is changed according to a number of times a logic level of a vertical synchronization signal is changed while a logic level of a horizontal synchronization signal is maintained.

12. The method of claim 11, wherein the horizontal period is from a time at which the horizontal synchronization signal is changed from a first logic level to a second logic level to a next time at which the horizontal synchronization signal is changed from the first logic level to the second logic level, and
    wherein the logic level of the horizontal synchronization signal is the second logic level.

13. The method of claim 12, wherein, in the horizontal period, the vertical synchronization signal is changed at least once from a third logic level to a fourth logic level, while the horizontal synchronization signal is maintained at the second logic level, and
    wherein, in the horizontal period, a period in which the vertical synchronization signal is maintained at the fourth logic level is shorter than a period in which the horizontal synchronization signal is maintained at the second logic level.

14. The method of claim 13, wherein, in the horizontal period, the vertical synchronization signal is maintained at the third logic level, while the horizontal synchronization signal is maintained at the first logic level.

15. The method of claim 13, further comprising outputting a scan signal having a turn-on level to at least some of the pixels from a fourth time to a fifth time during the horizontal period,
wherein the logic level of the sensing signal is maintained from the second time to the fifth time.

16. The method of claim 11, wherein an output period of the data voltages when the number of times the logic level of the vertical synchronization signal is changed is n times and an output period of the data voltages when the number of times the logic level of the vertical synchronization signal is changed is m times have the same length and have different phases with respect to the horizontal period, and
wherein the n and the m are different positive integers.

17. The method of claim 16, wherein a level maintenance period of the sensing signal when the number of times the logic level of the vertical synchronization signal is changed is the n times and a level maintenance period of the sensing signal when the number of times the logic level of the vertical synchronization signal is changed is the m times have the same length and have different phases with respect to the horizontal period.

18. The method of claim 11, wherein an output period of the data voltages when the number of times the logic level of the vertical synchronization signal is changed is n times and an output period of the data voltages when the number of times the logic level of the vertical synchronization signal is changed is m times have different lengths with respect to the horizontal period, and
wherein the n and the m are different positive integers.

19. The method of claim 18, wherein a level maintenance period of the sensing signal when the number of times the logic level of the vertical synchronization signal is changed is the n times and a level maintenance period of the sensing signal when the number of times the logic level of the vertical synchronization signal is changed is the m times have different lengths with respect to the horizontal period.

20. The method of claim 12, wherein the vertical synchronization signal has a third logic level or a fourth logic level, and
wherein a frame period is changed with respect to when the horizontal synchronization signal has the first logic level and the vertical synchronization signal has the fourth logic level.

* * * * *